(12) United States Patent
Kawashima

(10) Patent No.: US 7,320,268 B2
(45) Date of Patent: Jan. 22, 2008

(54) CUTTING, PROFILING, AND EDGE-PREPARING APPARATUS

(75) Inventor: Shinji Kawashima, Chiba-ken (JP)

(73) Assignee: Kenichi Mori, Yokohama (JP), part interest ( * ) Notice: Subject to any disclaimer, the term of this patent is extended or adjusted under 35 U.S.C. 154(b) by 565 days.

(21) Appl. No.: 10/829,524

(22) Filed: Apr. 22, 2004

(65) Prior Publication Data

US 2005/0247171 A1    Nov. 10, 2005

(30) Foreign Application Priority Data

Nov. 5, 2003    (JP)    ............... 2003-375989

(51) Int. Cl.
B23B 5/08    (2006.01)
(52) U.S. Cl. ..................................... 82/113
(58) Field of Classification Search ............... 82/113; 409/173, 178, 179, 138, 139
See application file for complete search history.

(56) References Cited

U.S. PATENT DOCUMENTS 4,449,871 A * 5/1984 Hillestad .................... 409/178
4,813,314 A * 3/1989 Kwech ........................ 82/113
5,165,206 A * 11/1992 Sword et al. ............... 451/439
5,549,024 A    8/1996 Ricci ........................... 82/113
6,189,425 B1 * 2/2001 Ricci et al. .................. 82/113
6,540,455 B1 * 4/2003 Speranza .................... 409/132
6,966,731 B2 * 11/2005 VanderPol et al. .......... 409/179

* cited by examiner

Primary Examiner—Willmon Fridie, Jr.
(74) Attorney, Agent, or Firm—Howson & Howson LLP

(57) ABSTRACT

An apparatus for cutting and/or profile machining an edge of a pipe is provided. The apparatus includes a housing, a rotatable faceplate mounted on a front surface of the housing, and a tool holder mounted on the faceplate and holding a cutting tool. In a first embodiment, a cutting apparatus includes gearing that permits the tool holder to be moved relative to a surface of a pipe in a rapid-feed mode, a slow-feed mode and a rapid-return mode. In second and third embodiments, a profile machining apparatus includes a carriage having a profiling roller or shaft that advances (or retracts) relative to a pipe along a path defined by a template. The carriage to which the cutting tool is mounted is pivoted about a support shaft permitting the carriage and tool to change its angle and orientation relative to the pipe while advancing or retracting.

8 Claims, 25 Drawing Sheets

CUTTING, PROFILING, AND EDGE-PREPARING APPARATUS

BACKGROUND OF THE INVENTION

The present invention relates to a cutting, profiling, and edge-preparing apparatus and, more particularly, to an apparatus for cutting a pipe to be used, for instance, in a nuclear power plant, and/or for preparing an edge of the pipe for welding.

A cutting and edge-preparing apparatus has been used for cutting a pipe and preparing an edge of a pipe for welding. The conventional cutting and edge-preparing apparatus is mounted on an outer surface of a pipe, i.e., workpiece, to cut the pipe and to prepare the edge of the pipe for welding. The apparatus typically includes a stationary unit, a revolving unit, and cutting tools. The stationary unit is fixedly mounted on the pipe, and the revolving unit is mounted on a front surface of the stationary unit such that it can rotate about the outer surface of the pipe. A pin is fixed to the stationary unit so as to project radially inward.

The revolving unit holds a tool holder to which a plurality of tools are mounted. The tool holder is typically provided with a star wheel, and a tool feed screw is connected coaxially to the star wheel. The tools move radially outward or inward when the star wheel is turned.

The pin of the stationary unit and the star wheel provided with the tool holder constitute a tool feed mechanism. When the revolving unit revolves about the pipe, the star wheel collides against the radially-projecting pin. The star wheel is turned by the shock experienced due to the collision of the star wheel against the pin, and the screw connected to the star wheel feeds the tools. Thus, the star wheel collides against the pin as the revolving unit revolves about the pipe, and the star wheel turns little-by-little to feed the tools.

In the foregoing conventional cutting and edge-preparing apparatus, the tools are fed by the collision of the star wheel against the pin. Consequently, the star wheel comes into contact with the pin and the star wheel is subjected to shocks generated by the collision when the apparatus operates. Accordingly, the operator of the apparatus is in danger of being caught in the moving and contacting parts of the apparatus. Moreover, there is a possibility that the revolving unit will fall off the apparatus due to the impact of the collisions and shocks, and machining accuracy is reduced.

Sometimes, the star wheel of the tool feed mechanism may fail to turn when the star wheel collides with the pin and, consequently, the tools held by the plurality of tool holders are not fed at the same rate. Further, the tool feed mechanism including the star wheel is utilized to feed the tools to the pipe and to return the tools to their home positions via the collisions of the star wheel with the pin. Thus, the tool feed mechanism of the conventional apparatus is unable to feed the tools in a rapid-feed mode and/or to return the tools in a rapid-return mode. Accordingly, it takes a long time to engage the tools with the outer surface of the pipe at the start of an operation, and the tools are returned to their home positions after the completion of a cutting operation in an amount of time that is equal to the time spent for the cutting operation.

In an alternative procedure, tool holders may be manually and individually returned to their home positions by the operator to curtail the time typically necessary for returning the tools to their home positions. When tool holders are returned to their home positions manually by the operator, the tool holders require re-mounting on the apparatus before the next cutting operation can begin. However, it is difficult to accurately mount the tool holders on the apparatus. The tools held by the two tool holders are required to be located at identical radial positions, respectively. The allowable range of error in the amount of radial projection of the tools is on the order of ±0.2 mm. A cutting edge of a tool that has a greater amount of radial projection than that of the other is subjected to greater loading, and it is possible that the tool will break unless errors in the respective amounts of radial projection of the tools are adjusted to within the above referenced allowable tolerances. Therefore, it is important that tool holders be accurately mounted on the apparatus.

In cutting a pipe and forming a groove in an edge of the pipe at a job site, the tool feed mechanism including the star wheel feeds the tools by a fixed feed upon the contact of the star wheel with the pin. Therefore, a large load is placed on the apparatus upon the impact of the star wheel on the pin and, sometimes, the apparatus becomes dislocated. Consequently, machining accuracy is reduced, roughness of the machined surface increases, and a stripe formed in a part of the circumference of the pipe at the completion of machining causes faulty welding. This unavoidably causes the need to change welding work and welding conditions.

In addition to cutting pipe, profile machining apparatus is also required to prepare an edge of a cut pipe. For example, in a nuclear power plant or like facilities, pipe connections are made by welding operations or the like, and this requires the edges of the pipes to be specially prepared or profiled.

Generally, as illustrated in FIGS. 21A, 21B and 21C, an inner surface grinding section 196, a recess 194, a lip 190, and a groove 192 are formed in the edges of each pipe being prepared for connection by a welding operation. Various groove shapes are utilized including, for instance, a single U-shaped groove as shown in FIG. 21A, a single V-shaped groove as shown in FIG. 21B, and a double bevel groove as shown in FIG. 21C. Typically, the desired shape of an edge of a pipe is determined according to wall material, wall thickness, and welding method.

As shown in FIG. 22A, a tool 186 of a conventional edge preparing apparatus is manually or automatically moved in a radial direction of a pipe "P" so as to form a lip 190 and a groove 192 in an outer edge of the pipe "P". In either case of manual or automatic operation, a cutting direction is limited to a direction along one axis. Therefore, when wall thickness or groove angle of a pipe "P" is large, a contact area of the tool 186 becomes very large, and the positioning of the entire apparatus relative to the pipe may be required to be changed. In this case, it is necessary to re-center the revolving unit and the pipe. In addition, since cutting volume is large, considerable skill is necessary for this operation and it is difficult to obtain satisfactory edge forming accuracy. When edge preparation is conducted on an outer surface of a pipe, it is especially difficult to control the thickness of the relatively thin lip of the desired edge profile.

Further, as shown in FIG. 22B, a tool 188 of a conventional edge-preparing apparatus is movable in a direction only along one axis (i.e., an axial direction of the pipe) to form an inner surface grinding section 196 and a recess 194 in an inner surface of the pipe "P" as well as that of FIG. 22A. Therefore, it is necessary to form a tool 188 according to the shape of the inner surface grinding section 196 and the recess 194 and place the tool 188 on an inner surface of the pipe "P" for the cutting operation. Therefore, when a machined area of an inner surface is large, a contact area of the tool 188 becomes very large at the part of the recess 194, and the position of the entire apparatus relative to the pipe may require frequent re-positioning. In this case, it is necessary to center the revolving unit and pipe repeatedly. In addition, since cutting volume is large, considerable skill is necessary for this operation, and it is difficult to obtain satisfactory edge forming accuracy.

In either case, the cutting operation is required to be conducted such that the cutting volume is relatively small since the apparatus must be movable at the job site. In addition, it is necessary to machine the lip with high accuracy to ensure stable welding of a root pass on a pipe. However, it is difficult for a conventional edge-preparing apparatus to realize such high-accuracy machining. Therefore, accuracy is improved by hand work polishing after machining. However, this is labor-consuming, and there is still great difficulty in obtaining the desired accuracy.

In view of the above-mentioned problems, objects of the present invention are to provide an improved cutting apparatus and to provide a profile machining apparatus in which the cutting tool has a small contact area and an edge profile of a pipe may be readily formed in any shape with high accuracy.

BRIEF SUMMARY OF THE INVENTION

To solve the foregoing problems, a first embodiment of the present invention provides a cutting and edge-preparing apparatus having a housing for placement about a workpiece and a rotatable faceplate mounted on a front surface of the housing. The apparatus also includes a motor, a gearbox, and at least one tool holder attached to the faceplate for holding a tool. The gearbox includes gearing for turning the faceplate and gearing connected to a power transmission shaft for advancing/retracting the tool holder. The faceplate turning gearing has a number of teeth different than that of the power transmission shaft turning gearing. The gearing for turning the power transmission shaft includes a changeable combination of gears which can be changed to change the difference between the number of teeth of the faceplate turning gearing and the number of teeth of the power transmission shaft turning gearing. Thus, the turning direction and turning speed of the power transmission shaft can be adjusted relative to the turning speed of the faceplate which permits the tool holder to be moved in rapid-feed, slow-feed and rapid-return modes.

The respective number of teeth of gears connected to the faceplate and the tool holder, respectively, can be differentiated from each other by a combination of gears held in the gearbox, so that the tool holder can be advanced and retracted on the faceplate with reliability. Thus, the apparatus does not vibrate, and noise is not generated when the tool holder is moved. In addition, the tool holder can be moved in rapid-feed and rapid-return modes.

According to another aspect of the present invention, a profile machining apparatus for the edge-preparation of a pipe is provided. This second embodiment of the present invention includes a housing that can be fixed to a workpiece, a faceplate that is mounted on a front surface of the housing and that is rotatable relative to the housing, and a tool holder that is mounted on the faceplate and that is capable of holding a tool. The tool holder has a carriage, a template, and a power transmission mechanism, or means. The carriage supports the tool at one end and a profiling roller at an opposite end, and the roller engages and follows the template. The power transmission mechanism receives power from the faceplate and advances and retracts the carriage in an axial direction of the pipe/workpiece. The carriage is supported on the faceplate such that it swings around a support shaft as the profiling roller follows the template. Thus, machining of the edge of the pipe, or workpiece, is conducted according to the profile of the template.

According to yet another aspect of the present invention, a further embodiment of a profile machining apparatus for the edge-preparation of a pipe is provided. The profile machining apparatus includes a housing fixed to a workpiece, a faceplate mounted on and rotatable about a front surface of the housing, and a tool holder mounted on the faceplate and capable of holding a tool. The tool holder has a carriage with the tool being mounted at one end, a template with a groove, and a power transmission mechanism, or means. The carriage has a profiling shaft which is engage within and follows the groove in the template. The power transmission mechanism receives power from the faceplate and advances/retracts the carriage. Thus, since the profiling shaft follows the groove in the template, the carriage enables an outer edge of the pipe/workpiece to be machined according to the contour of the template.

Since the movement of the tool is controlled by the above referenced templates and since the position, direction, and orientation of the tool is automatically changed as the tool is advanced and retracted, a contact area of the tool with the pipe is minimized, and the edge of the pipe can readily be formed in any shape with ease and at high accuracy. In contrast, conventional edge-preparing apparatus enable a cutting direction along only one axis, and the tool needs to have a shape according to the shape desired for the machined pipe edge since the shape of the pipe edge is determined by the shape of the tool. This problem is overcome with the present invention, and a pipe edge of any desired shape can be formed with the present invention utilizing standard cutting tools.

DETAILED DESCRIPTION OF THE INVENTION

Figure 1A:
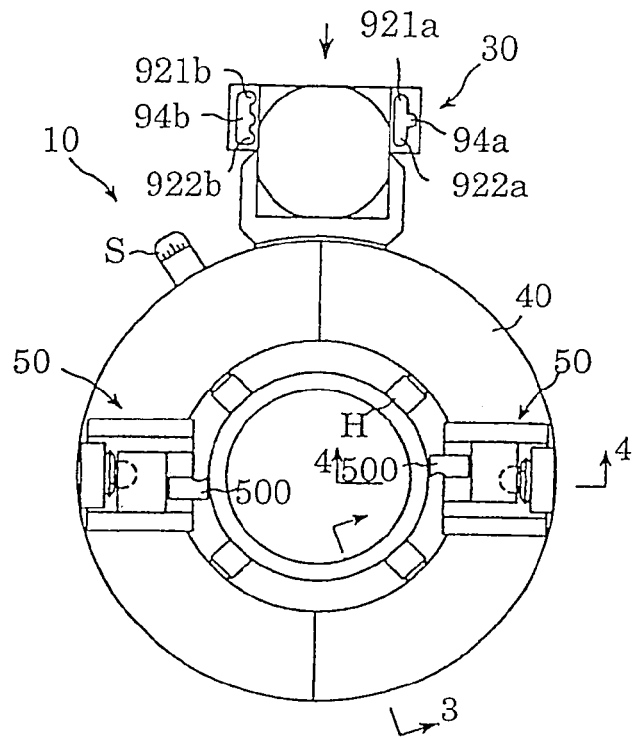
FIGS. 1A and 1B are a front elevational view and a side elevational view, respectively, of a first embodiment of a cutting and edge-preparing apparatus according to the present invention.
Figure 1B:
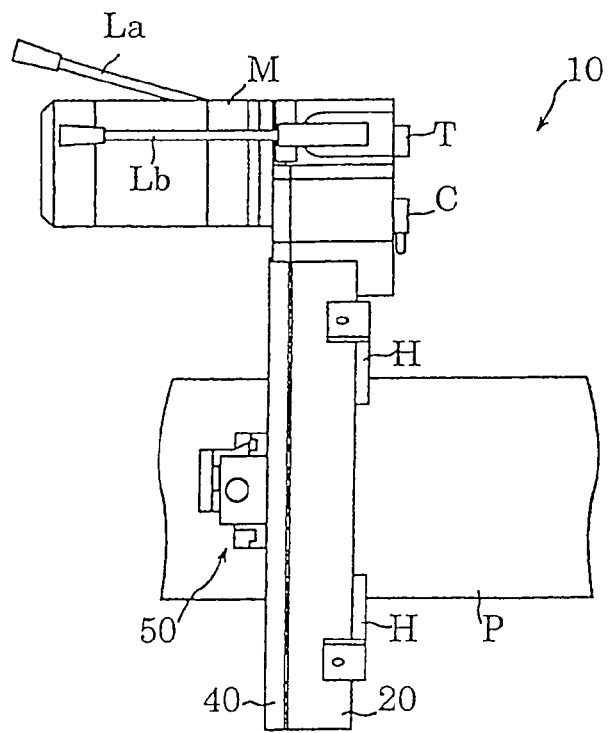

FIG. 1 illustrates a first embodiment of a cutting apparatus 10 according to the present invention. FIG. 1A is a front elevation of the cutting and edge-preparing apparatus 10, and FIG. 1B is a side elevation of the cutting and edge-preparing apparatus 10 mounted on a pipe "P". The cutting and edge-preparing apparatus 10 is of a two-piece divided type construction similar to conventional cutting and edge-preparing apparatus.

The apparatus 10 includes a housing 20, a gearbox 30, a faceplate 40, tool holders 50, and a motor "M". A plurality of feet "H" project radially inward from the inner circumference of the housing 20 and hold the cutting and edge-preparing apparatus 10 on the pipe "P". The housing 20 contains a speed-changing compound ring gear 60 and has a front surface on which the faceplate 40 is rotatably supported. A pair of tool holders 50 are utilized to mount tools 500 to the faceplate 40 such that the tools 500 are mounted at diametrically opposite locations. The tools 500 illustrated in the drawings are only examples of the "tools" according to the present invention and any cutting tool known in the art can be utilized. For example, the tools 500 include those that produce chips as well as those that do not produce any chips during a cutting or grinding operation.

As best illustrated in FIG. 1B, apparatus 10 can include a clutch "C" which is utilized when mounting the cutting and edge-preparing apparatus 10 on pipe "P". To this end, the clutch "C" is operated to disengage the motor "M" from the faceplate 40 and is operated again to engage the motor "M" with the faceplate 40 after the faceplate 40 is manually turned and centered and after the position of the faceplate 40 is measured relative to pipe "P" with a dial gage (not shown). Thus, clutch "C" enables the motor "M" to be disengaged from the faceplate 40 and facilitates centering of the faceplate 40.

As best illustrated in FIG. 1B, apparatus 10 can also include a torque limiter "T" to protect the apparatus 10 from damage in the event that load on the motor "M" exceeds a fixed level. To this end, the torque limiter "T" intercepts a transmission of power from the motor "M" to the gearbox 30 when trouble occurs causing the load on the motor "M" to exceed the fixed level.

The apparatus 10 can also include a scale plate "S" as shown in FIG. 1A. The scale plate "S" indicates the position of the tools 500 during operation of the apparatus 10.

Figure 2:
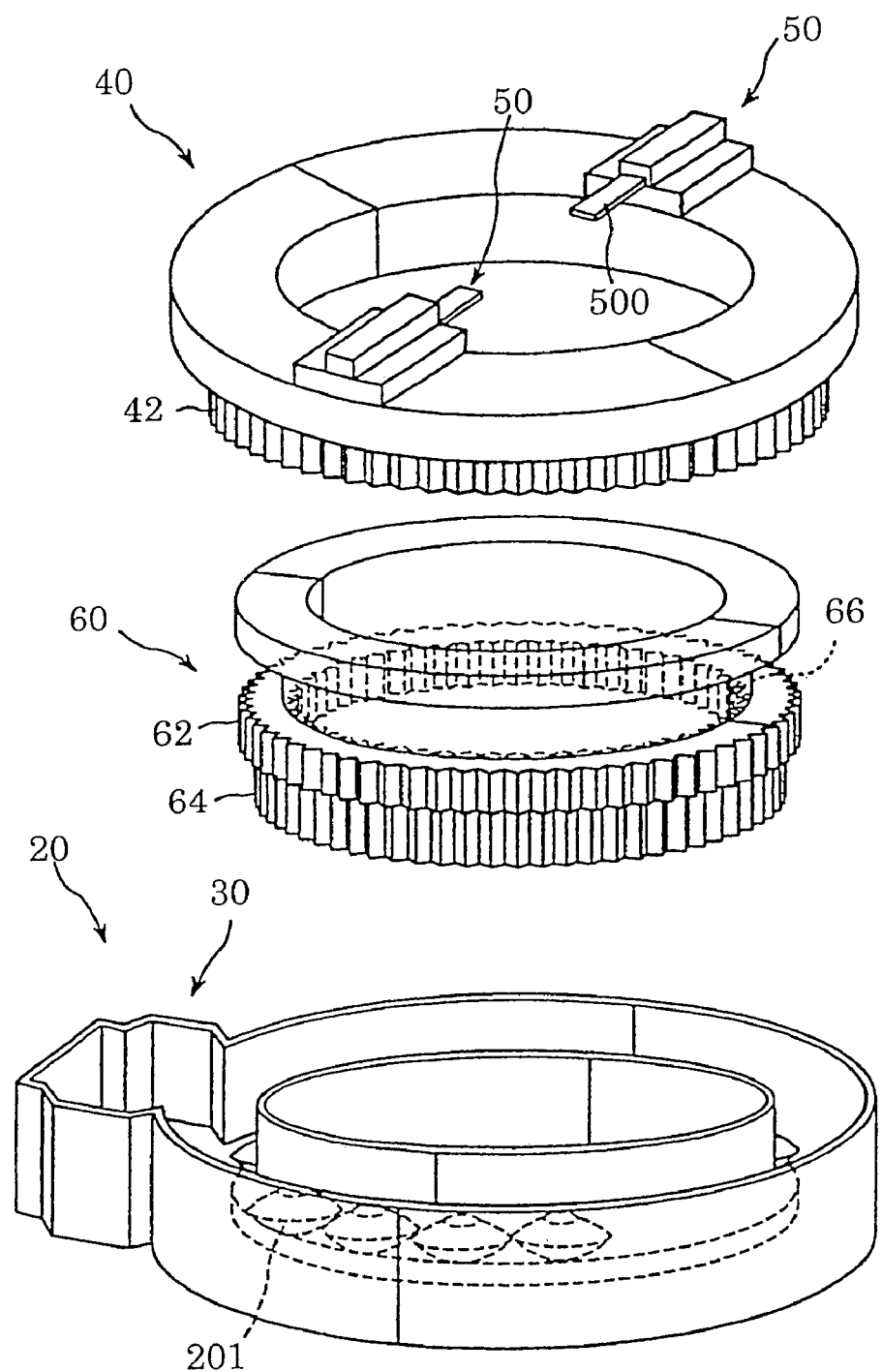
FIG. 2 is an exploded perspective view of a part of the apparatus illustrated in FIG. 1A.

An exploded perspective view of the cutting and edge-preparing apparatus 10 is provided in FIG. 2 in which for illustrative purposes the motor "M" and members held in the gearbox 30 are omitted. The housing 20 contains a plurality of guide rollers 201. As illustrated, the speed-changing compound ring gear 60 has an internal gear 66, a large external gear 62, and a small external gear 64 that has a different number of teeth than that of the large external gear 62. In addition, a faceplate gear 42, which is illustrated as an external ring gear in FIG. 2, is attached to a rear surface of the faceplate 40.

Figure 3:
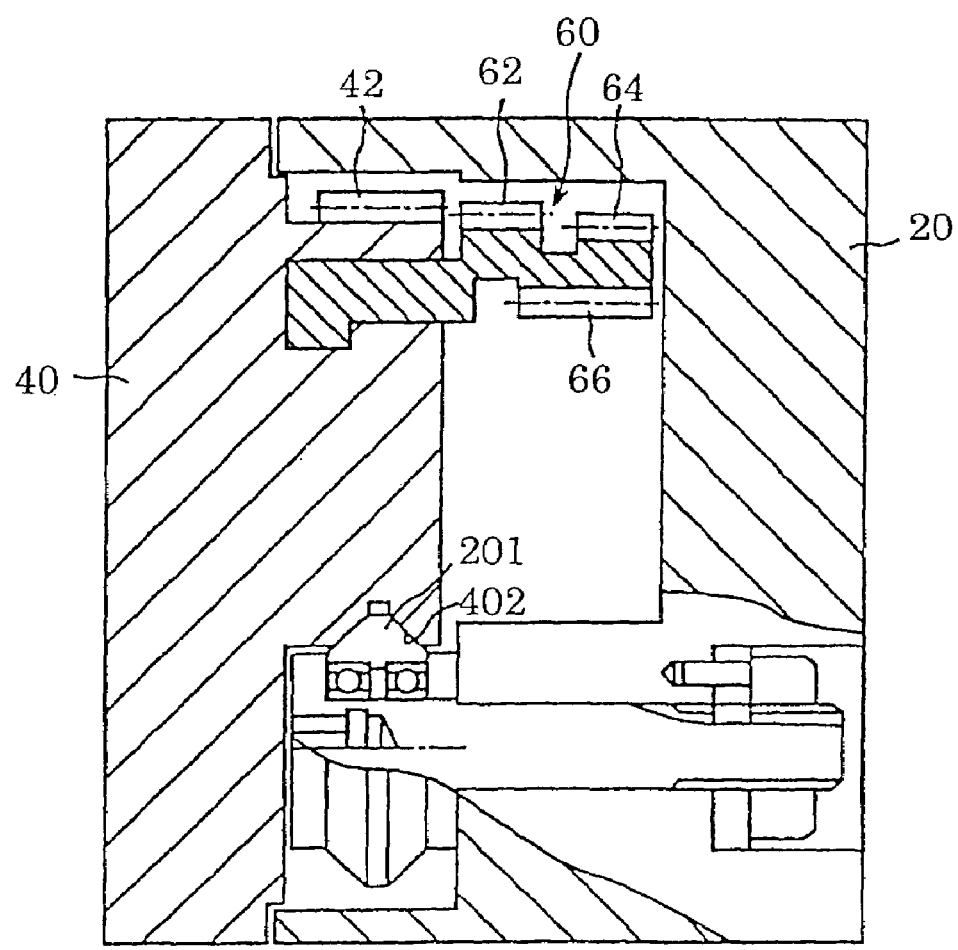
FIG. 3 is a cross-sectional view of the apparatus illustrated in FIG. 1A taken on the line 3-3 in FIG. 1A.

As shown in FIG. 3, which is a sectional view taken on the line 3-3 in FIG. 1A, the faceplate 40 is provided on its inner surface with a groove 402, and the guide rollers 201 held in the housing 20 are received in the groove 402 to ensure stable rotation of the faceplate 40. Rotation of the output shaft of the motor "M" is transmitted through gearing held in the gearbox 30 to the faceplate gear 42. When the motor "M" is operated, the faceplate 40 rotates continuously, and the speed-changing compound ring gear 60 rotates together with the faceplate 40.

Figure 4:
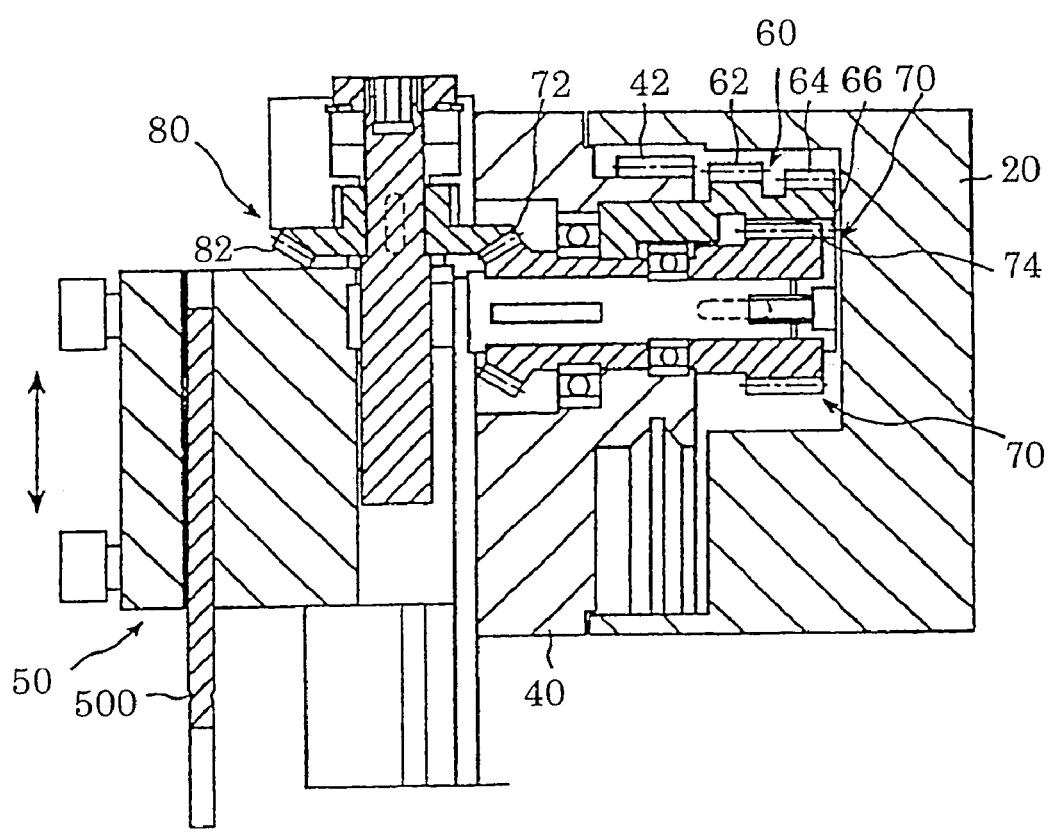
FIG. 4 is a cross-sectional view of the apparatus illustrated in FIG. 1A taken on the line 4-4 in FIG. 1A.

FIG. 4, which is a sectional view taken on the line 4-4 in FIG. 1A, illustrates a tool holder operating mechanism for feeding and returning the tool holder 50 of the cutting and edge-preparing apparatus 10. A power transmission shaft 70 is supported for rotation in bearings on a part of the faceplate 40 that corresponds to a location of one of the tool holders 50. The power transmission shaft 70 has a first end provided with a bevel gear 72 and a second end provided with a spur gear 74. The spur gear 74 is in mesh with the internal gear 66 of the speed-changing compound ring gear 60. When the speed-changing compound ring gear 60 is turned relative to the faceplate 40, the power transmission shaft 70 rotates accordingly.

The tool holder 50 has a feed screw 80 provided with a bevel gear 82 in mesh with the bevel gear 72 of the power transmission shaft 70. The feed screw 80 is rotated to move the tool holder 50 in the directions of the arrow shown in FIG. 4. Since the spur gear 74 of the power transmission shaft 70 is in mesh with the internal gear 66 of the speed-changing compound ring gear 60, the two tool holders 50 mounted on the faceplate 40 are synchronously moved.

The tool holder operating mechanism for operating the tool holder 50 of the cutting and edge-preparing apparatus 10 does not have any members that correspond to a fixed pin and a rotating star wheel that strikes on the pin as provided in conventional cutting and edge-preparing apparatus. In the cutting and edge-preparing apparatus 10 of the present invention, the rotation of the output shaft of the motor "M" is transmitted to the members (i.e., via the speed-changing compound ring gear 60, the power transmission member 70, and the feed screw 80) to operate the tool holders 50. Therefore, shocks which are associated with conventional apparatus are not produced by apparatus 10 according to the present invention, and there is no possibility that the operator will become caught in apparatus 10. Thus, the tool holders 50 according to the present invention can be surely and reliably moved at a predetermined rate.

Figure 5:
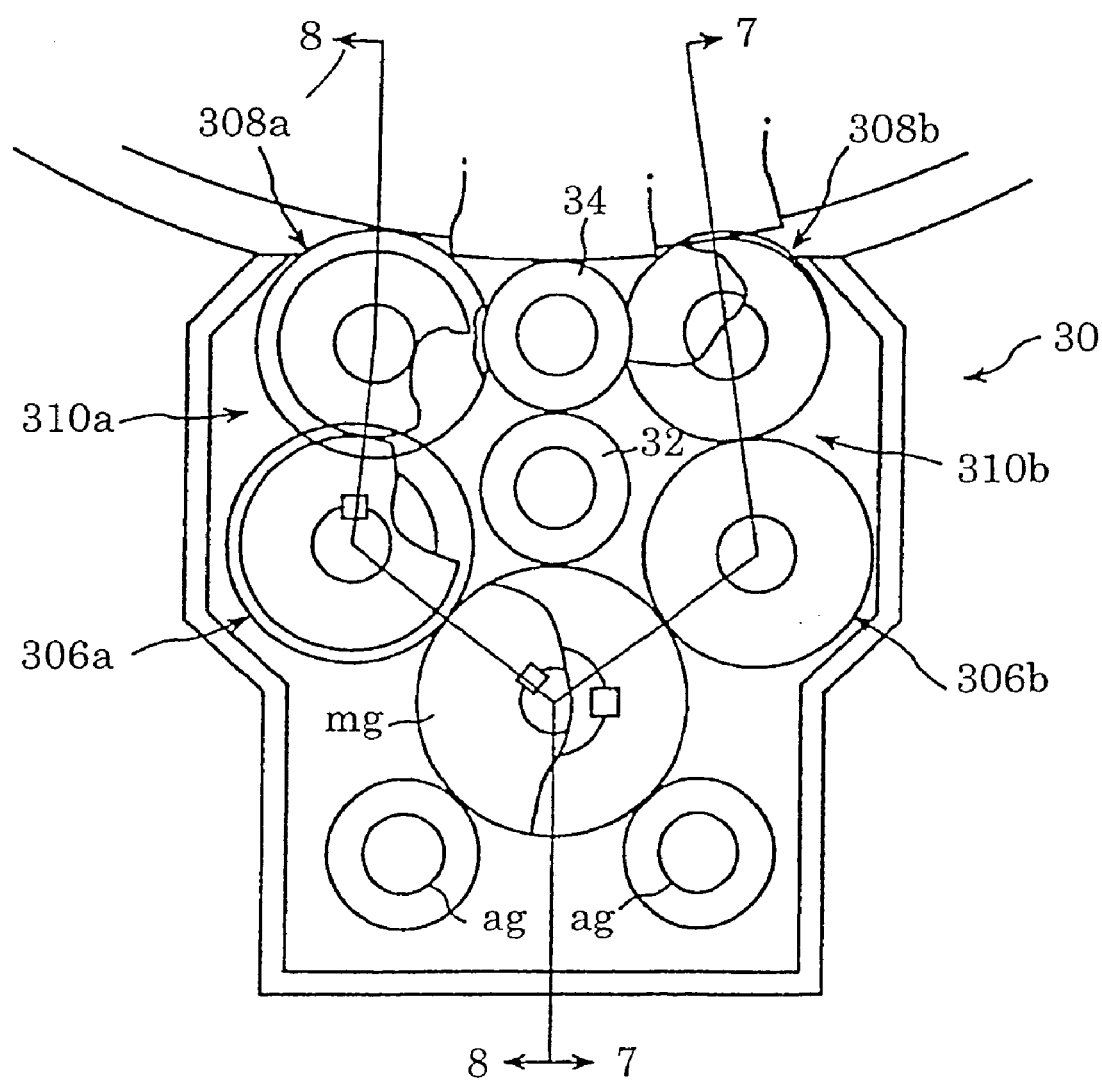
FIG. 5 is a front elevational view of a gearbox of the apparatus illustrated in FIG. 1A with a cover of the gearbox being removed.
Figure 6:
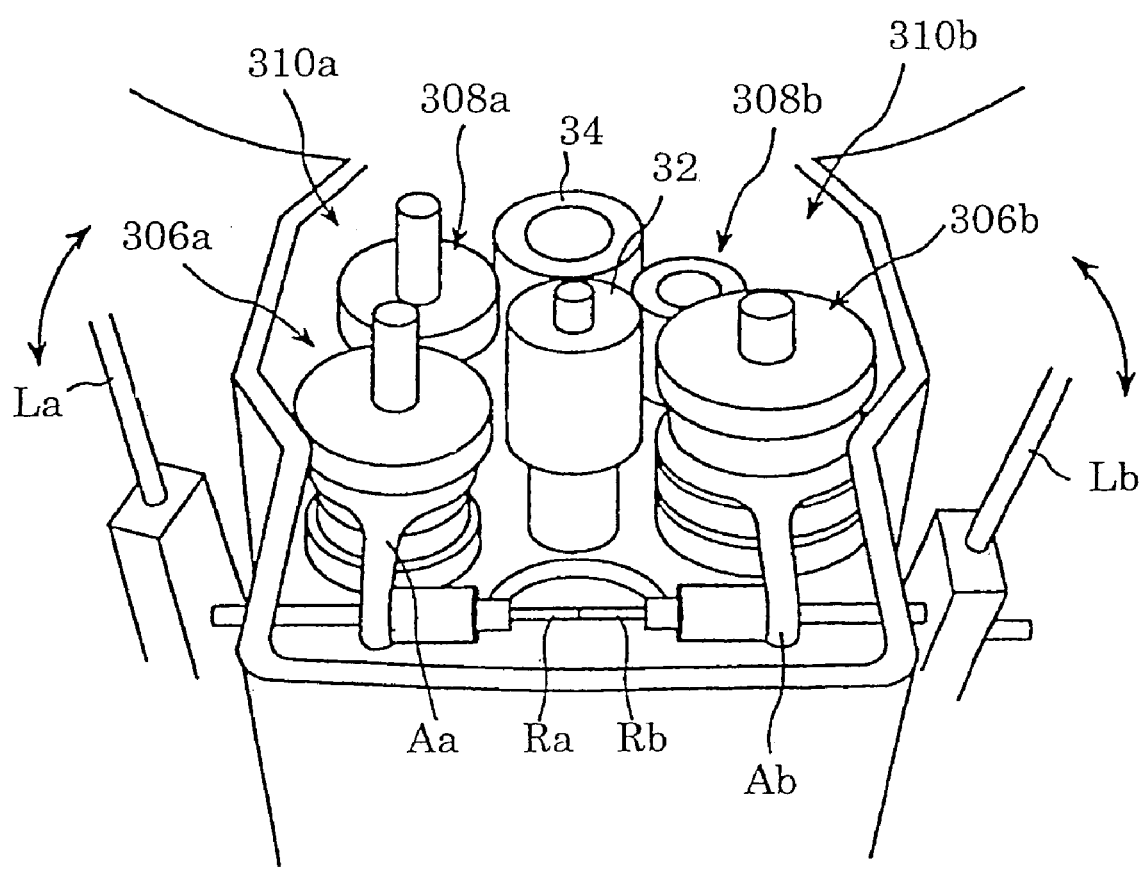
FIG. 6 is a perspective view of the gearbox illustrated in FIG. 5.

FIGS. 5 and 6 illustrate the gearbox 30 of the cutting and edge-preparing apparatus 10 of the present invention. FIG. 5 illustrates a front elevation of the gearbox 30 with its cover removed corresponding to a view taken in the direction of the arrow shown in FIG. 1A. FIG. 6 is a perspective view of the gearbox 30 shown in FIG. 5. In FIG. 6, the teeth of gears are omitted for ease of illustration. A main gear "mg" and a pair of auxiliary gears "ag" are illustrated in FIG. 5. The main gear "mg" is keyed to the output shaft (not shown) of the motor "M", and the auxiliary gears "ag" are for use in stabilizing the rotation of the main gear "mg". The auxiliary gears "ag" do not participate in rotating the faceplate 40 and/or operating the tool holders 50.

As best illustrated in FIGS. 5 and 6, a driven gear 32, a faceplate drive gear 34, two compound gears 306a and 306b, and two transmission gears 308a and 308b are arranged in the gearbox 30. The compound gear 306a and the transmission gear 308a form a rapid-feed-and-return gearing 310a for use in moving the tool holders 50 in a rapid-feed mode and a rapid-return mode, and compound gear 306b and the transmission gear 308b form a feed gearing 310b for moving the tool holders 50 in a rapid-feed mode and a slow-feed mode. The driven gear 32 is always in mesh with the main gear "mg" and the faceplate drive gear 34 to transmit the rotation of the main gear "mg" to the faceplate drive gear 34.

The respective operations of the feed gearing 310b and the rapid-feed-and-return gearing 310a are substantially the same. The number of teeth of these gears differ from each other so that, when engaged, the tool holders 50 operate in a selected one of the rapid-feed, slow-feed, and rapid-return modes.

Figure 7:
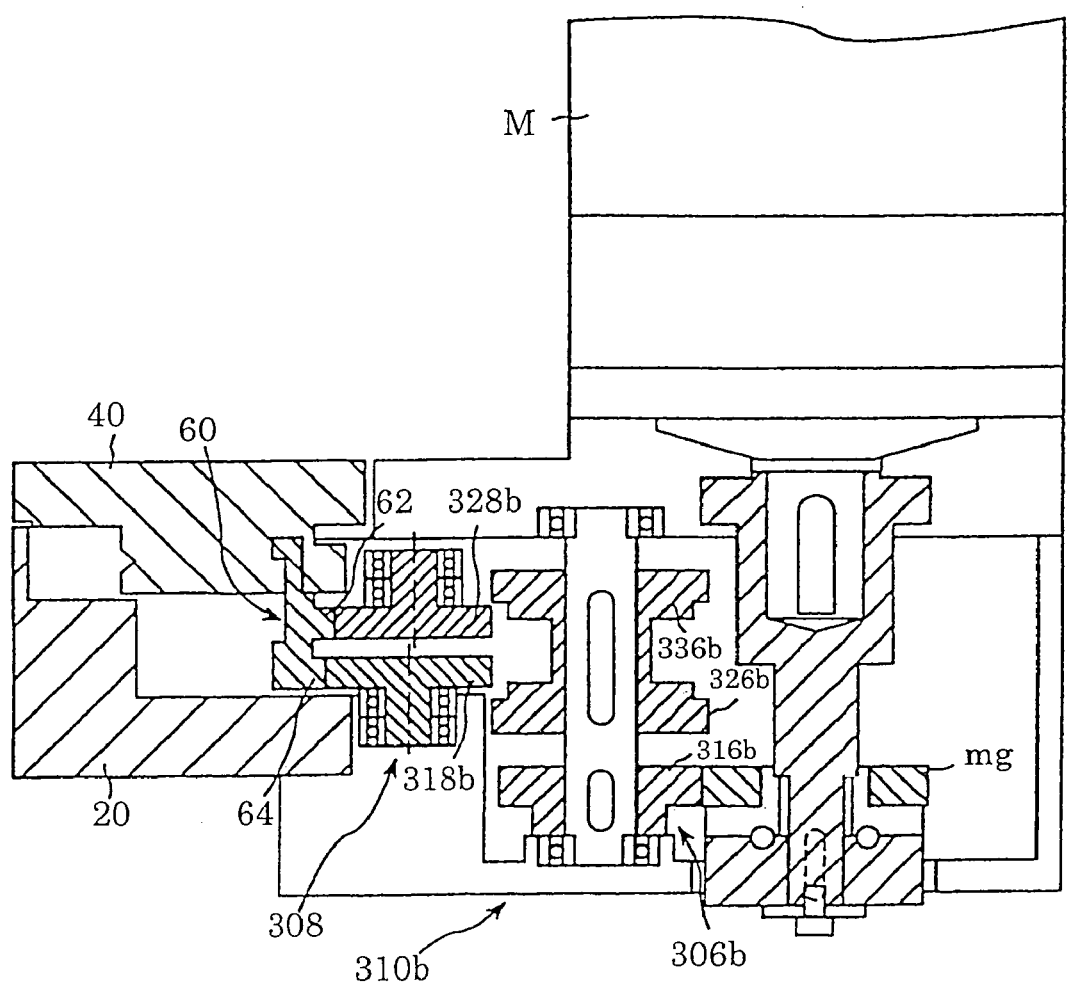
FIG. 7 is a cross-sectional view of the gearbox and apparatus taken on line 7-7 in FIG. 5 and illustrates a feed gearing for the rapid feed and slow feed of a tool holder.

The feed gearing 310b is used to operate the tool holders 50 in rapid-feed and/or slow-feed modes and is best illustrated in FIG. 7, which is a sectional view taken on the line 7-7 in FIG. 5. The housing 20, the faceplate 40, the speed-changing compound ring gear 60, and the motor "M" are also illustrated in FIG. 7. The compound gear 306b has a first gear 316b that is mounted on one end of a shaft and that is meshed with the main gear "mg". The compound gear 306b also has a second gear 326b and a third gear 336b that are mounted on the shaft and that are interlocked with the shaft by splines so as to be axially movable on the shaft. The rotation of the output shaft (not shown) of the motor "M" is transmitted to the first gear 316b.

The transmission gear 308b consists of a large transmission gear 318b and a small transmission gear 328b. The respective numbers of teeth of the transmission gears 318b and 328b are different from each other. The transmission gears 318b and 328b are supported on different shafts, and are in mesh with the small gear 64 and the large gear 62 of the speed-changing compound ring gear 60, respectively. That is, the two transmission gears 318b and 328b are two separate gears.

When the second gear 326b and the third gear 336b (which are interlocked with the shaft by splines) is shifted upward (as viewed on FIG. 7), the second gear 326b of the compound gear 306b engages the large transmission gear 318b and transmits the rotation of the output shaft of the motor "M" to the small gear 64 of the speed-changing compound ring gear 60. When the second gear 326b and the third gear 336b of the compound gear 306b is shifted downward (as viewed in FIG. 7), the third gear 336b of the compound gear 306b engages the small transmission gear 328b and transmits the rotation of the output shaft of the motor "M" to the large gear 62 of the speed-changing compound ring gear 60.

The rotating speed of the speed-changing compound ring gear 60 will be different depending on whether the compound gear 306b is in mesh with the large transmission gear 318b or the small transmission gear 328b. To this end, the speed-changing compound ring gear 60 is rotated at a relatively high rotating speed relative to the faceplate 40 when the rotation of the output shaft of the motor "M" is transmitted through the large transmission gear 318b to the speed-changing compound ring gear 60, and the speed-changing compound ring gear 60 is rotated at a relatively slow rotating speed relative to the faceplate 40 when the rotation of the output shaft of the motor "M" is transmitted through the small transmission gear 328b to the speed-changing compound ring gear 60. In either case, the rotating speed of the output shaft of the motor "M" is fixed, and the rotating speed of the speed-changing compound ring gear 60 is faster than that of the faceplate 40. As mentioned above, the tool holders 50 are moved by the power transmission shafts 70 by rotating the speed-changing compound ring gear 60 relative to the faceplate 40.

For purposes of example, suppose that the number of teeth of the faceplate gear 42 is Z, and the numbers of teeth of the large gear 62 and the small gear 64 of the speed-changing compound ring gear 60 are Z-2 and Z-4, respectively. The difference between the rotating speed of the speed-changing compound ring gear 60 relative to that of the faceplate gear 42 when the same is driven through the large gear 62 and that of the speed-changing compound ring gear 60 relative to that of the faceplate gear 42 when the same is driven through the small gear 64 is proportional to the difference in the number of teeth between the large gear 62 and the small gear 64. The tool holder 50 is moved by this difference in rotation. When the rotation of the output shaft of the motor "M" is transmitted through the small gear 64 to the power transmission shaft 70, the power transmission shaft 70 turns through an angle corresponding to the four teeth while the output shaft of the motor "M" makes one full revolution. When the rotation of the output shaft of the motor "M" is transmitted through the large gear 62 to the power transmission shaft 70, the power transmission shaft 70 turns through an angle corresponding to the two teeth while the output shaft of the motor "M" makes one full revolution. Thus, the tool holders 50 are fed when the rotating speed of the speed-changing compound ring gear 60 is higher than that of the faceplate 40 at a feed rate, corresponding to the difference in rotating speed between the speed-changing compound ring gear 60 and the faceplate 40.

Figure 8:
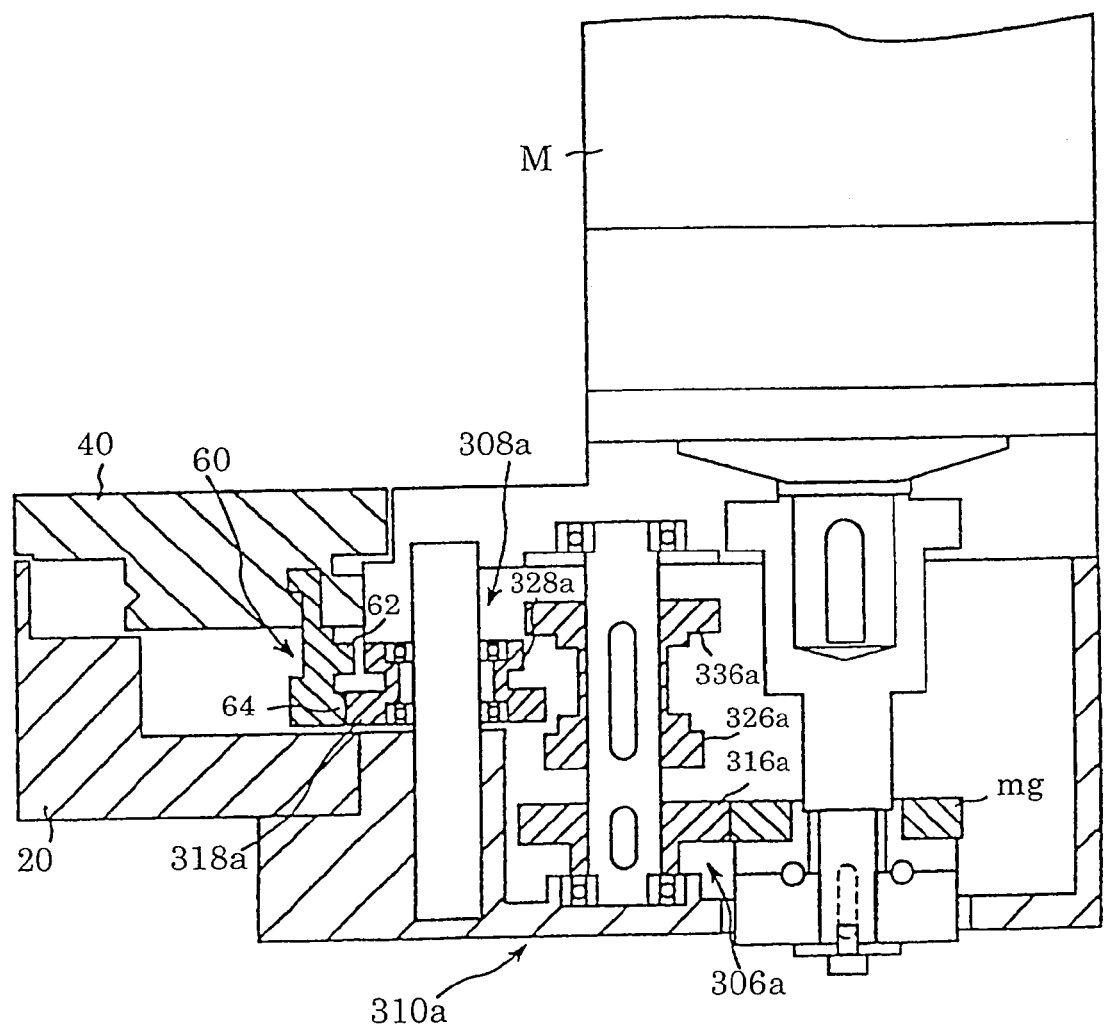
FIG. 8 is a cross-sectional view of the gearbox and apparatus taken on line 8-8 in FIG. 5 and illustrates a rapid-feed-and-return gearing for the rapid feed and rapid return of a tool holder.

The rapid-feed-and-return gearing 310a for moving the tool holders 50 in a rapid-feed mode and a rapid-return mode is best illustrated in FIG. 8, which is a sectional view taken on the line 8-8 in FIG. 5. The rapid-feed-and-return gearing 310a feeds the tool 500 rapidly to a machining position and returns the tool 500 rapidly to its home position after the completion of machining. The rapid-feed-and-return gearing 310a is similar to the foregoing feed gearing 310b and includes the compound gear 306a having a first gear 316a, a second gear 326a, and a third gear 336a, and a transmission gear 308a having a large transmission gear 318a and a small transmission gear 328a. The large transmission gear 318a and the small transmission gear 328a differ from the large transmission gear 318b and the small transmission gear 328b shown in FIG. 7 in that the transmission gear 318a and the small transmission gear 328a are coaxial and integrally formed. As illustrated in FIG. 8, the large gear 62 of the speed-changing compound ring gear 60 does not come into contact with the transmission gear 308a.

The rapid-feed-and-return gearing 310a feeds the tool holders 50 when the rotating speed of the power transmission shaft 70 interlocked with the speed-changing compound ring gear 60 is greater than that of the faceplate 40, and returns the tool holders 50 when the rotating speed of the power transmission shaft 70 interlocked with the speed-changing compound ring gear 60 is slower than that of the faceplate 40. To return the tool holders 50, the set of the second gear 326a and the third gear 336a (which are interlocked to the shaft by splines) is shifted upward (as viewed in FIG. 8) so that the second gear 326a of the compound gear 306a engages the large transmission gear 318a. This causes the rotation of the output shaft of the motor "M" to be transmitted to the small gear 64 of the speed-changing compound ring gear 60. To feed the tool holders 50, the set of the second gear 326a and the third gear 336a is shifted downward (as viewed in FIG. 8) so that the third gear 336a of the compound gear 306a engages the small transmission gear 328a and so that the rotation of the output shaft of the motor "M" is transmitted to the small gear 64 of the speed-changing compound ring gear 60.

As best illustrated in FIG. 6, shift arms "Ab" and "Aa" are combined with the shafts of the compound gears 306b and 306a of the feed gearing 310b and the rapid-feed-and-return gearing 310a, respectively, to axially shift the compound gears 306b and 306a. The shift arms "Ab" and "Aa" are connected to levers "Lb" and "La" by rods "Rb" and "Ra", respectively. The operator operates the lever "Lb" or "La" to shift the compound gear 306b of the feed gearing 310b or the compound gear 306a of the rapid-feed-and-return gearing 310a axially for rapid feed, slow feed or rapid return.

FIGS. 7 and 8 show states where the compound gears 306b and 306a are at their neutral positions, with the second gear 326b and the third gear 336b of the compound gear 306b, and the second gear 326a and the third gear 336a of the compound gear 306a not in mesh with the transmission gears 308b and 308a, respectively. In the above referenced states of the neutral positions, rotation of the output shaft of the motor "M" is not transmitted to the power transmission shaft 70, and only the faceplate 40 and the speed-changing compound gear 60 rotate. Consequently, the tool holders 50 are maintained at a fixed position on the faceplate 40.

As best illustrated in FIG. 6, the rods "Ra" and "Rb" can be turned individually about their axes by operating the levers "La" and "Lb", respectively, and the inner ends of the rods "Ra" and "Rb" are in contact with each other. Referring to FIG. 1A in which the levers "La" and "Lb" are omitted, the levers "La" and "Lb" extend externally of apparatus 10 through a slot provided with a first recess 921a, a second recess 922a, and a neutral recess 94a for a neutral position, and a slot provided with a first recess 921b, a second recess 922b, and a recess 94b for a neutral position, respectively. The levers "La" and "Lb" are held at desired positions by the first recess 921a, the second recess 922a, or the neutral recess 94a, and by the first recess 921b, the second recess 922b, or the neutral recess 94b, respectively.

In FIG. 1A, the lever "La" extends through the slot and is interlocked with the rapid-feed-and-return gearing. The lever "La" is positioned in the first recess 921a for the rapid-return mode and is positioned in the second recess 922a for the rapid-feed mode. The lever "Lb" extends through the other slot and is interlocked with the feed gearing. The lever "Lb" is positioned in the first recess 921b for the rapid-feed mode and is positioned in the second recess 922b for the slow-feed mode.

When the lever "La" ("Lb") is engaged in the recess 921a or 922a (921b or 922b), the rod "Ra" ("Rb") connected to the lever "La" ("Lb") pushes the rod "Rb" ("Ra") to engage the lever "Lb" ("La") in the neutral recess 94b (94a). Consequently, when the lever "La" ("Lb") is operated to engage the compound gear 306a (306b) with the transmission gear 308a (308b), the compound gear 306b (306a) is unable to be engaged with the transmission gear 308b (308a). Thus, both the compound gears 306a and 306b are never permitted to be simultaneously engaged by mistake or otherwise with the transmission gears 308a and 308b. Both the levers "La" and "Lb" can be simultaneously set at their neutral positions. When the levers "La" and "Lb" are set at their neutral positions, the rotation of the output shaft of the motor "M" is not transmitted to the power transmission shafts 70 and, consequently, the tool holders 50 are kept fixed. The shapes of the slots and the recesses formed in the slots are not limited to the illustrated recesses 921a, 922a, 921b and 922b, and any suitable number of recesses may be utilized.

Operation of the cutting and edge-preparing apparatus 10 can be remote-controlled or automatically controlled when the levers "La" and "Lb" are operated by pneumatic cylinder actuators or the like, which is suitable for work in nuclear facilities and in contaminated environments.

The cutting and edge-preparing apparatus of the present invention is capable of surely advancing and retracting machining tools without generating vibrations and noise. Consequently, machining accuracy is improved and work can be carried out with safety.

The rapid-feed mode, the slow-feed mode, or the rapid-return mode can be simply selected by properly operating the levers. Consequently, the tools 500 can be rapidly moved near to the workpiece at the start of processing, and time necessary for returning the tools to their home positions after the completion of processing can be remarkably curtailed.

Since the plurality of tool holders can be synchronously moved and can be rapidly returned, the tool holders do not need to be removed, and the relative positions of the plurality of tools are kept unchanged.

Another advantage, as previously stated, is that, when a clutch is interposed between the motor and the faceplate, the motor does not need to be removed every time the cutting and edge-preparing apparatus is mounted on and centered relative to a workpiece.

Figure 21A:
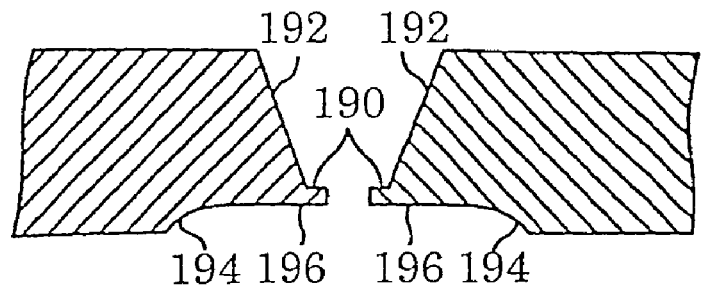
FIGS. 21A, 21B and 21C are cross sectional views of pipes having different edge profiles that are known in the art.
Figure 21B:
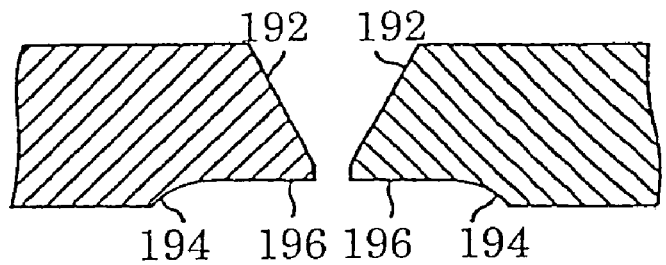
Figure 21C:
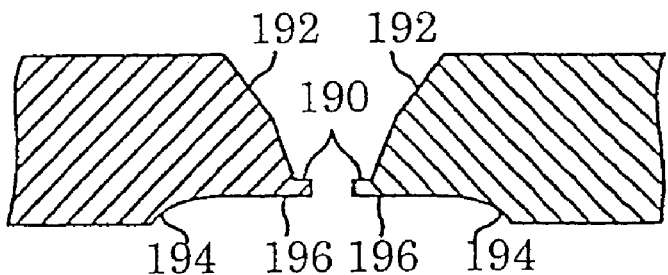
Figure 22A:
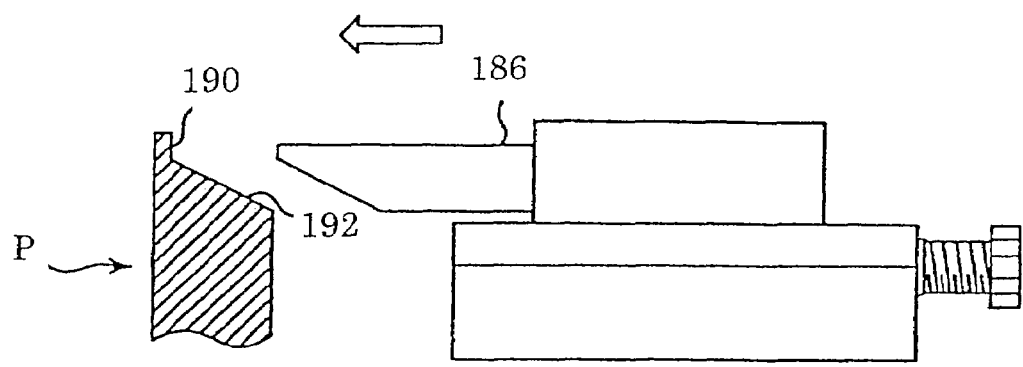
FIGS. 22A and 22B are front and side elevational views of cutting and edge-preparing apparatus according to the prior art.
Figure 22B:
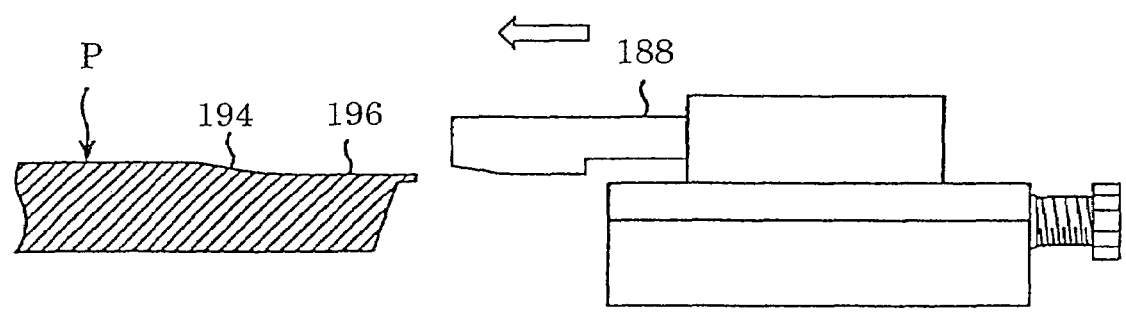

Turning to a second embodiment according to the present invention, a profile machining apparatus 110 for edge-preparation of a pipe is shown in FIGS. 9-15. FIG. 9A shows a front view of the profiling apparatus 110, and FIG. 9B shows a side view of the edge-preparing apparatus 110 mounted on a pipe. For ease of illustration, a manual feed apparatus 200 is shown in FIG. 9A, but not in FIG. 9B. The profile machining apparatus 110 is used to form an inner surface grinding section and a recess in an inner surface of a pipe. For example, see the profiles illustrated in FIGS. 21A, 21B, and 21C.

Figure 9A:
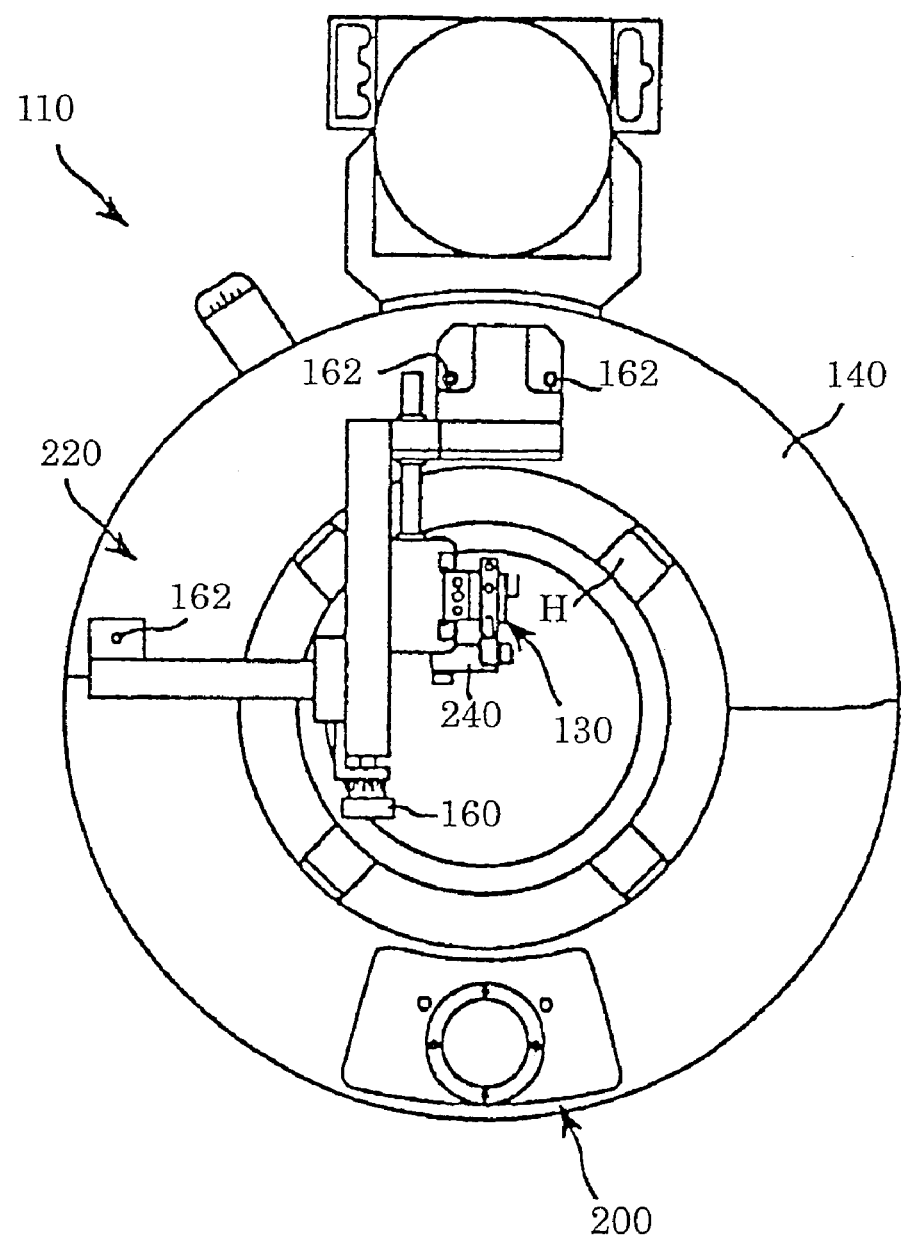
FIGS. 9A and 9B are a front elevational view and a side elevational view, respectively, of a second embodiment of a profiling, machining, and edge-preparing apparatus according to the present invention.
Figure 9B:
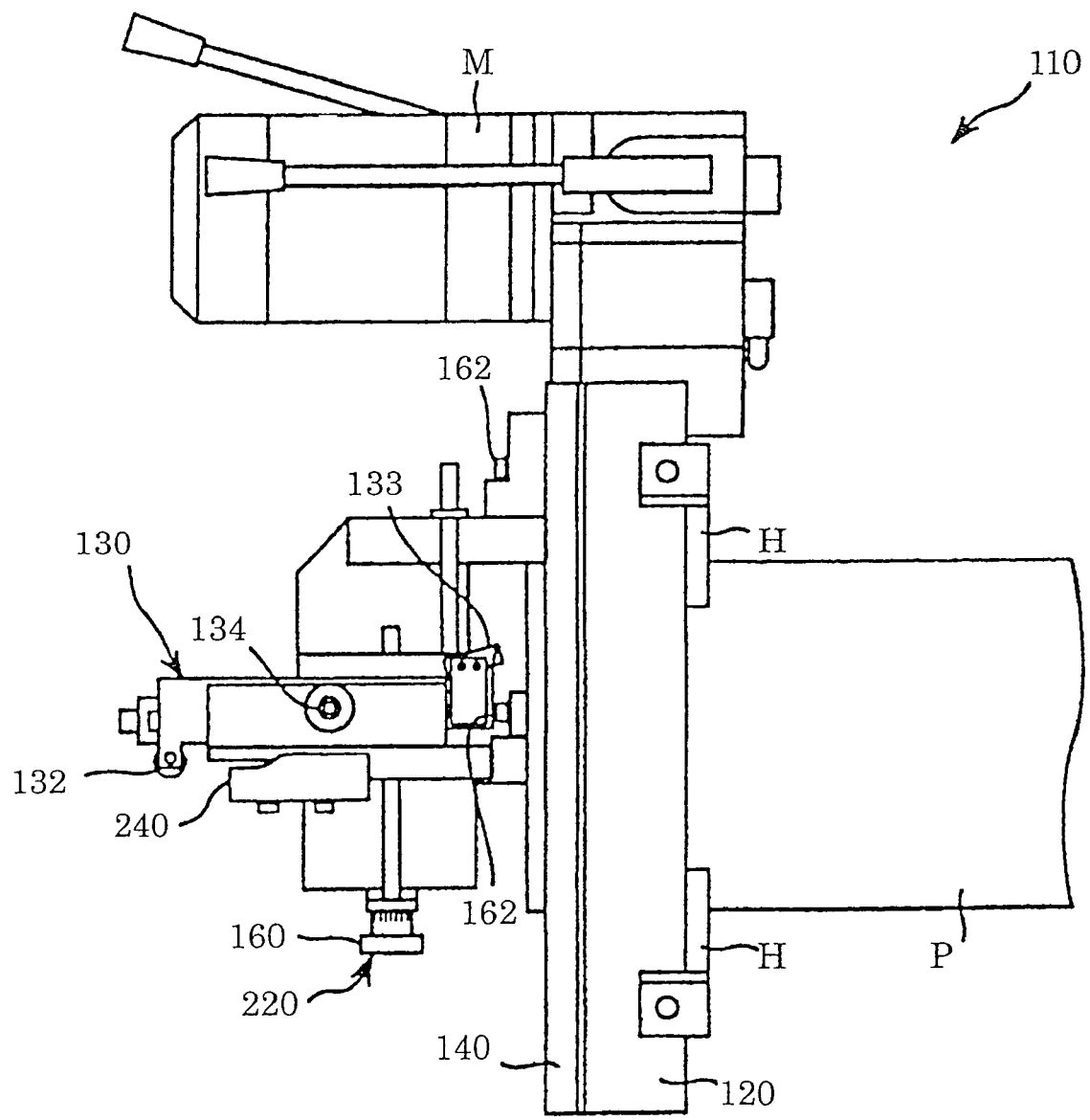

As shown in FIGS. 9A and 9B, the profile machining apparatus 110 includes a housing 120 mounted on a pipe "P", a faceplate 140 rotatably mounted on a front surface of the housing 120, and a tool holder 220 which is mounted on the faceplate 140 and holds a tool 133. The tool holder 220 is mounted on the faceplate 140 with lock screws 162. When the faceplate 140 rotates and the relative velocity between the faceplate 140 and a ring gear (not shown) is generated, an inner surface of the pipe "P" is cut by the tool 133.

The tool holder 220 has a carriage 130 with the tool 133 being located at one end and a profiling roller 132 located at an opposite end. The tool holder 220 also has a template 240 that the profiling roller 32 can engage and follow. In addition, the tool holder 220 has a power transmission mechanism (described in more detail below) for receiving power from the faceplate 140 and for advancing and retracting the carriage 130 in an axial direction of the pipe "P". The carriage 130 is pivotally supported so as to swing around and about a support shaft 134. When the profiling roller 132 advances (or retracts) and follows the template 240, the carriage 130 changes its angle around the support shaft 134 while it advances (or retracts).

Figure 10:
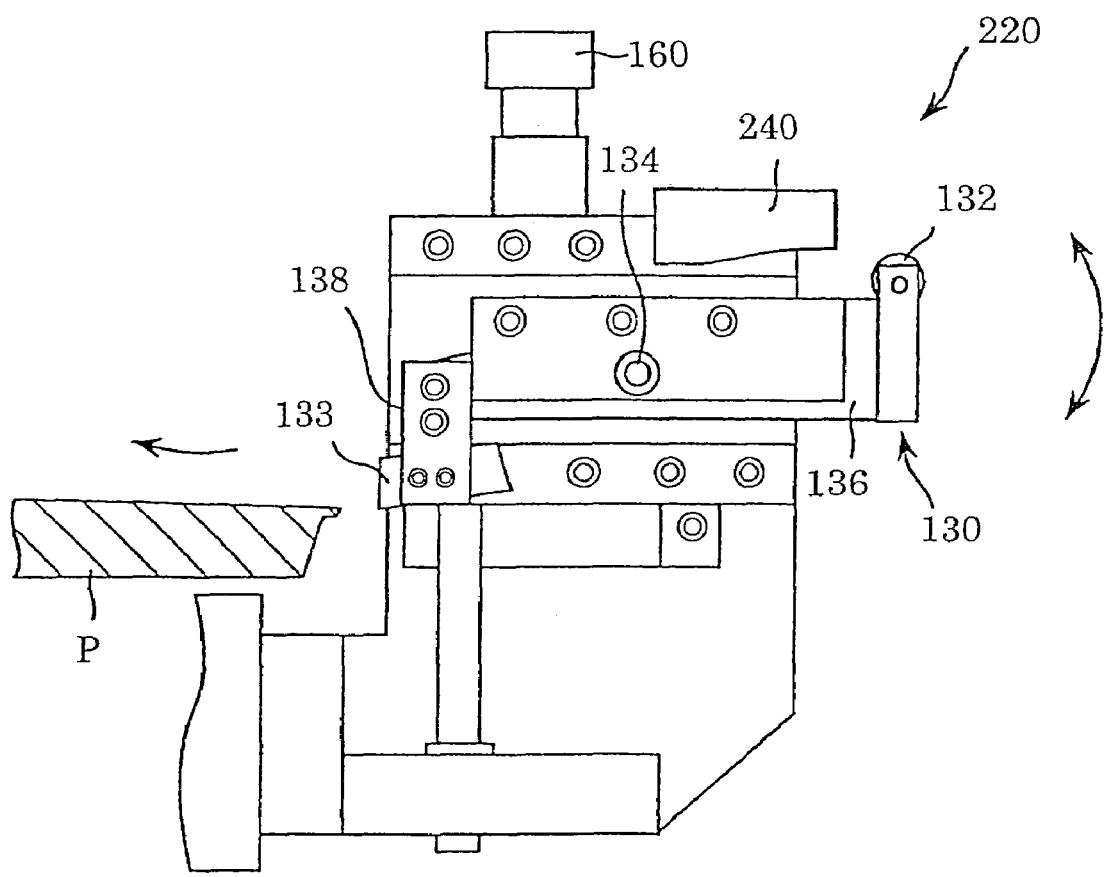
FIG. 10 is an elevational view of a tool holder of the profiling apparatus illustrated in FIG. 9A adjacent an edge of a pipe.

The movement of the tool holder 220 of the profile machining apparatus 110 is best illustrated in FIG. 10. The carriage 130 includes the profiling roller 132, a swing plate 136, and a tool holding member 138. The swing plate 136 is free to swing about the support shaft 134.

First, the carriage 130 is moved in an axial direction of a pipe "P" to an appropriate position in a rapid-feed mode as described with respect to the first embodiment of the present invention. Next, the position of the tool 133 relative to a radial direction of the pipe "P" is manually adjusted utilizing a handle 160. Thereafter, the carriage 130 continues to advance in a slow-feed mode (as described with respect to the first embodiment of the present invention) in an axial direction of the pipe "P" until the profiling roller 132 contacts a forward end of the template 240. After the profiling roller 132 is in contact with the forward end of the template 240, the profiling roller 32 follows the contour of the template 240, and the carriage 130 swings about the support shaft 134. In this way, the tool 133 swings and is positioned and oriented according to the contour of the template 240. The shape of the template 240 may be formed in any shape. Thus, an edge of a pipe can be formed with an inner surface grinding section and a recess of any shape in an easy manner and with great accuracy.

When machining is completed, the carriage 130 is returned to its home position in a rapid-return mode (as described with respect to the first embodiment of the present invention). Further, the tool holder 220 can be set to the inside diameter of the pipe "P" by adjustment with the manual handle 160, and a length of an inner surface grinding section, which is straight in cross section, is adjusted and set by a distance between the profiling roller 132 and the template 240.

Conventionally, there has not existed the above disclosed profile machining apparatus for edge-preparation which forms an inner diameter grinding section and a recess of a pipe using a power transmission mechanism which utilizes the difference between the numbers of teeth of gears as described with respect to the first embodiment of the present invention. There has only been an edge-preparing apparatus which machines a pipe by pressing the whole surface of a tool thereon. The profile machining technology of the present invention minimizes contact area of the tool with the pipe and accomplishes edge preparation of pipes with great accuracy.

Figure 11:
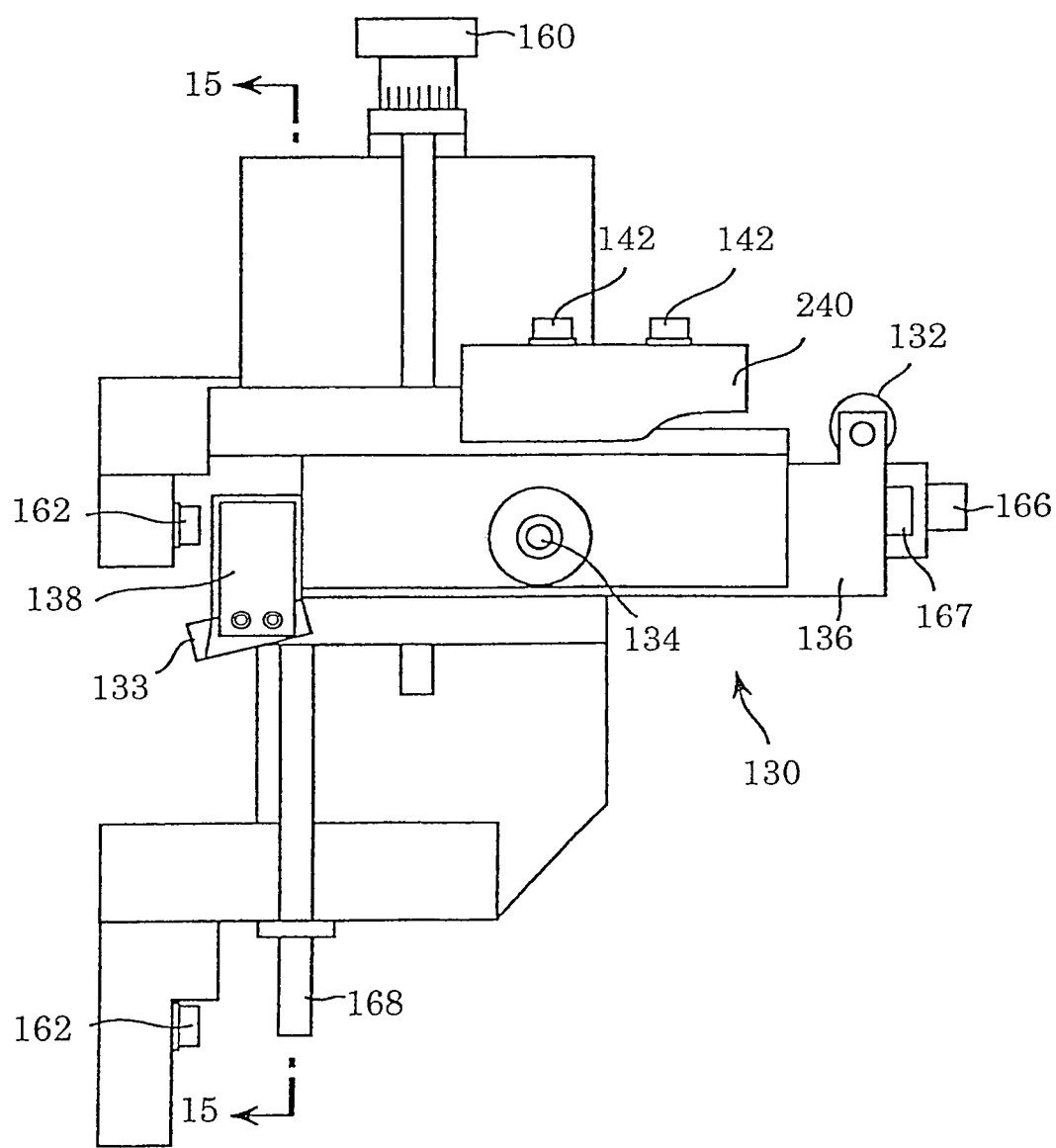
FIG. 11 is a front elevational view of a tool holder of the profiling apparatus illustrated in FIG. 9A.
Figure 12:
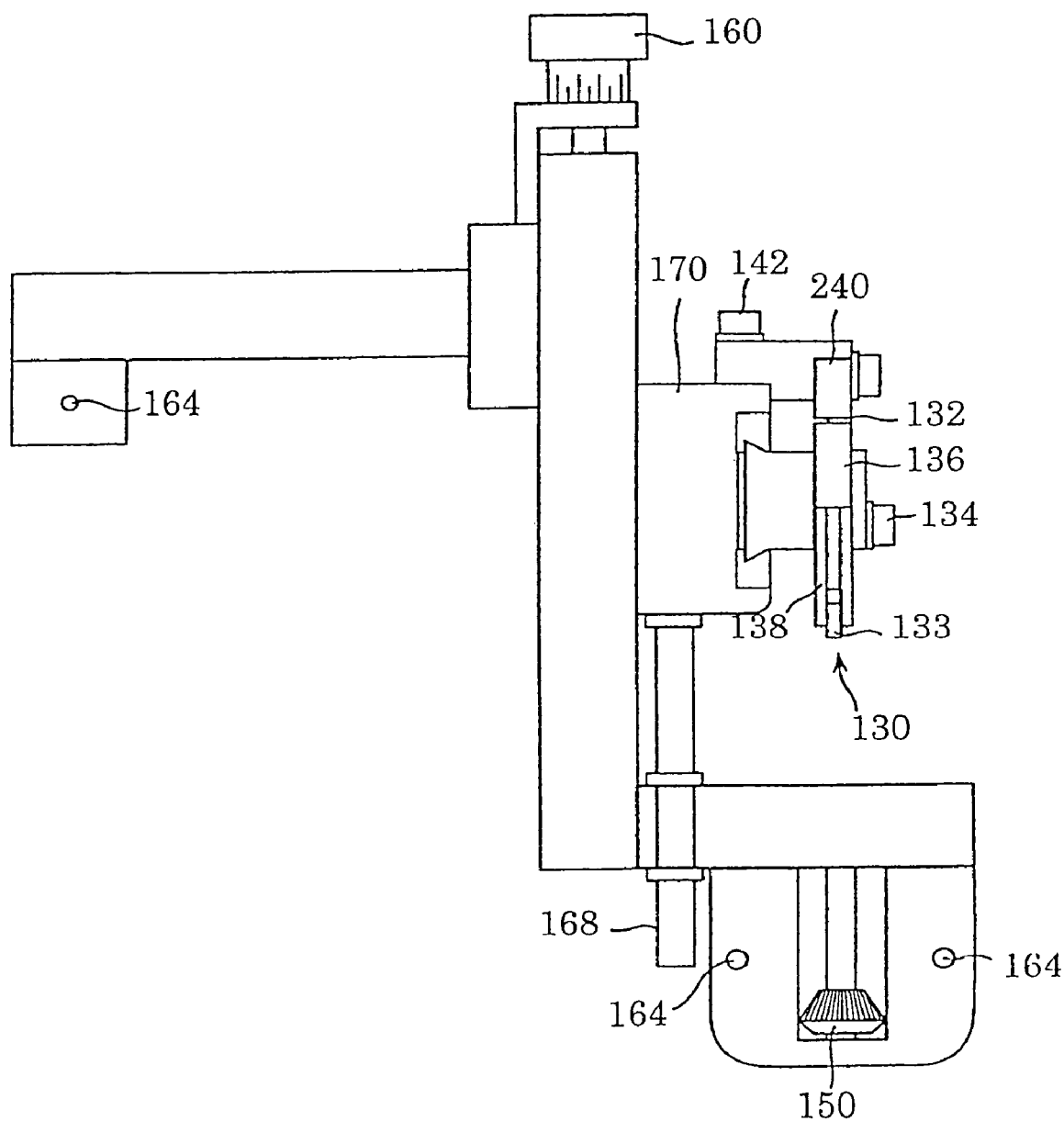
FIG. 12 is a left side elevational view of a tool holder of the profiling apparatus illustrated in FIG. 9A.
Figure 13:
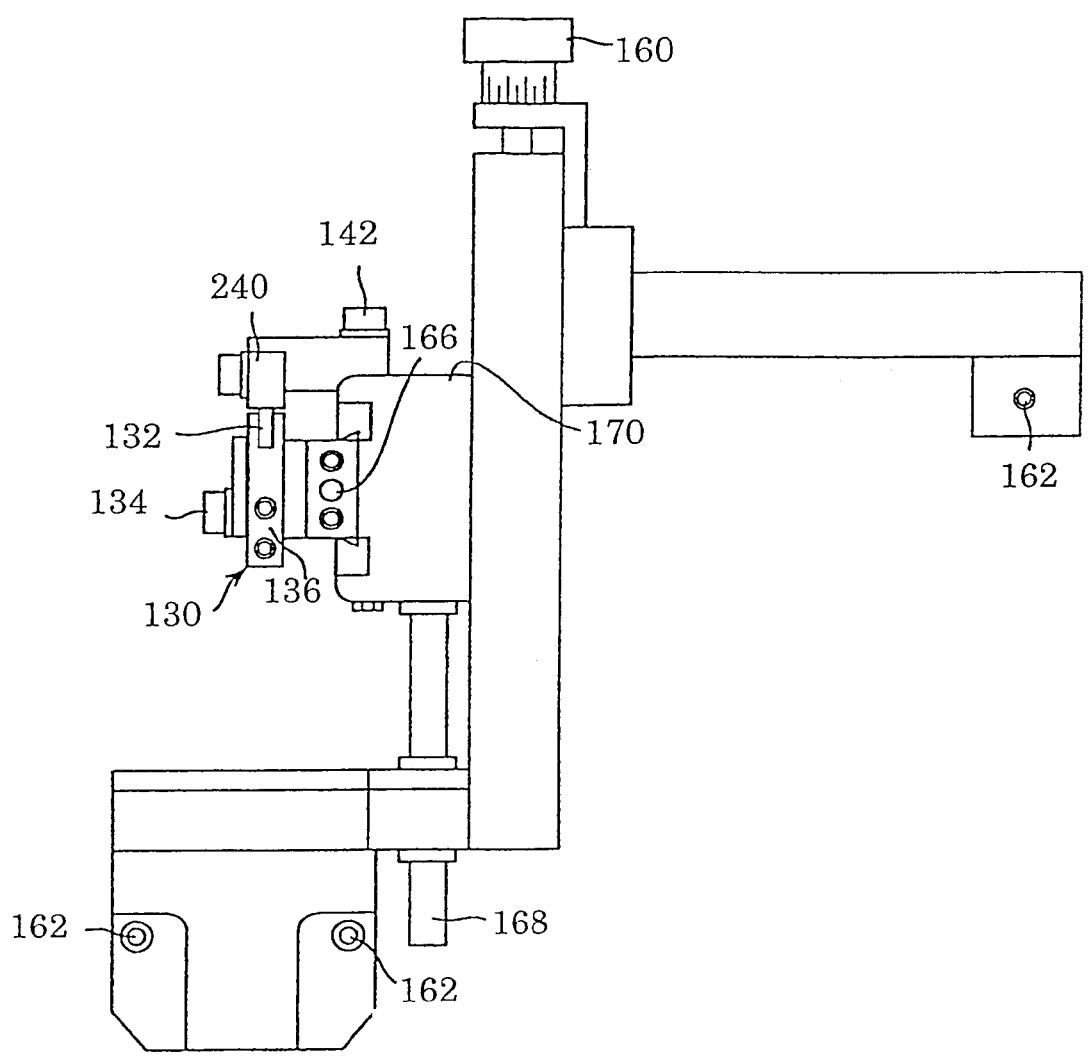
FIG. 13 is a right side elevational view of a tool holder of the profiling apparatus illustrated in FIG. 9A.
Figure 14:
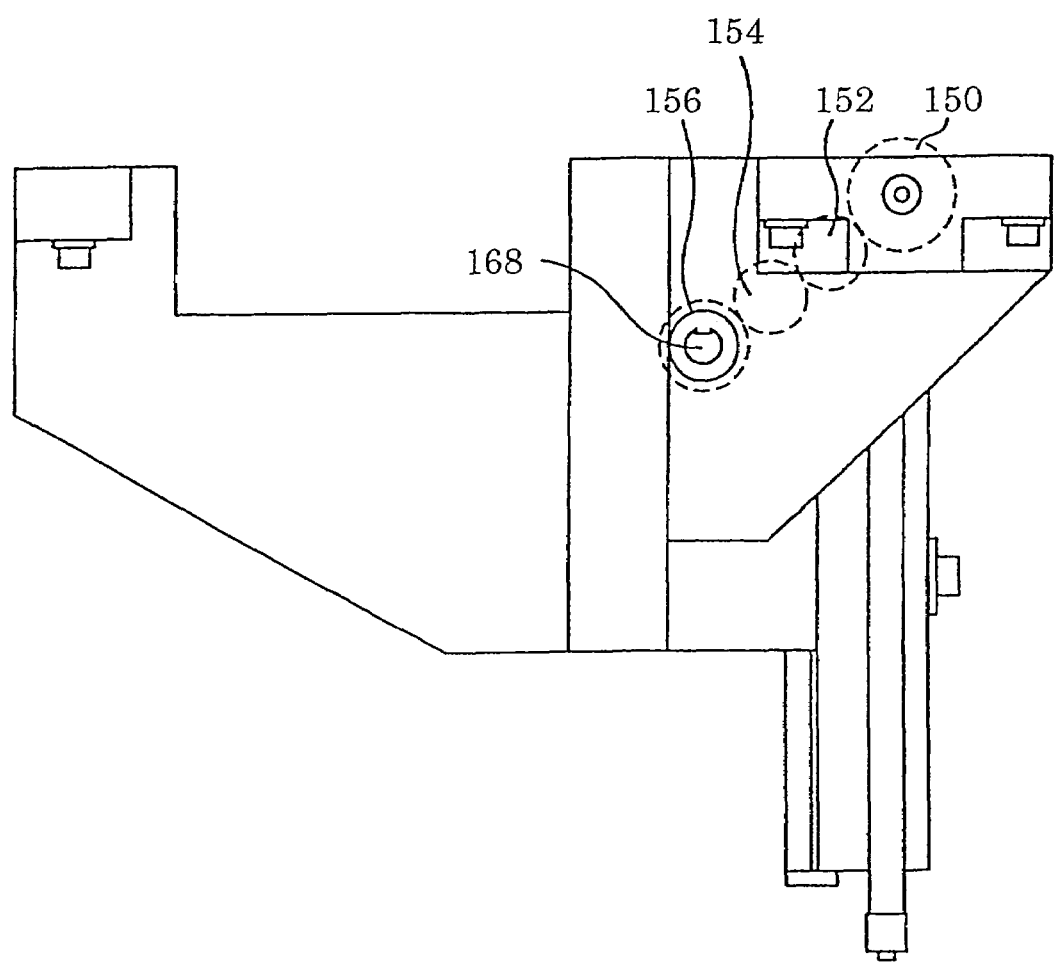
FIG. 14 is a bottom plan view of a tool holder of the profiling apparatus illustrated in FIG. 9A.
Figure 15:
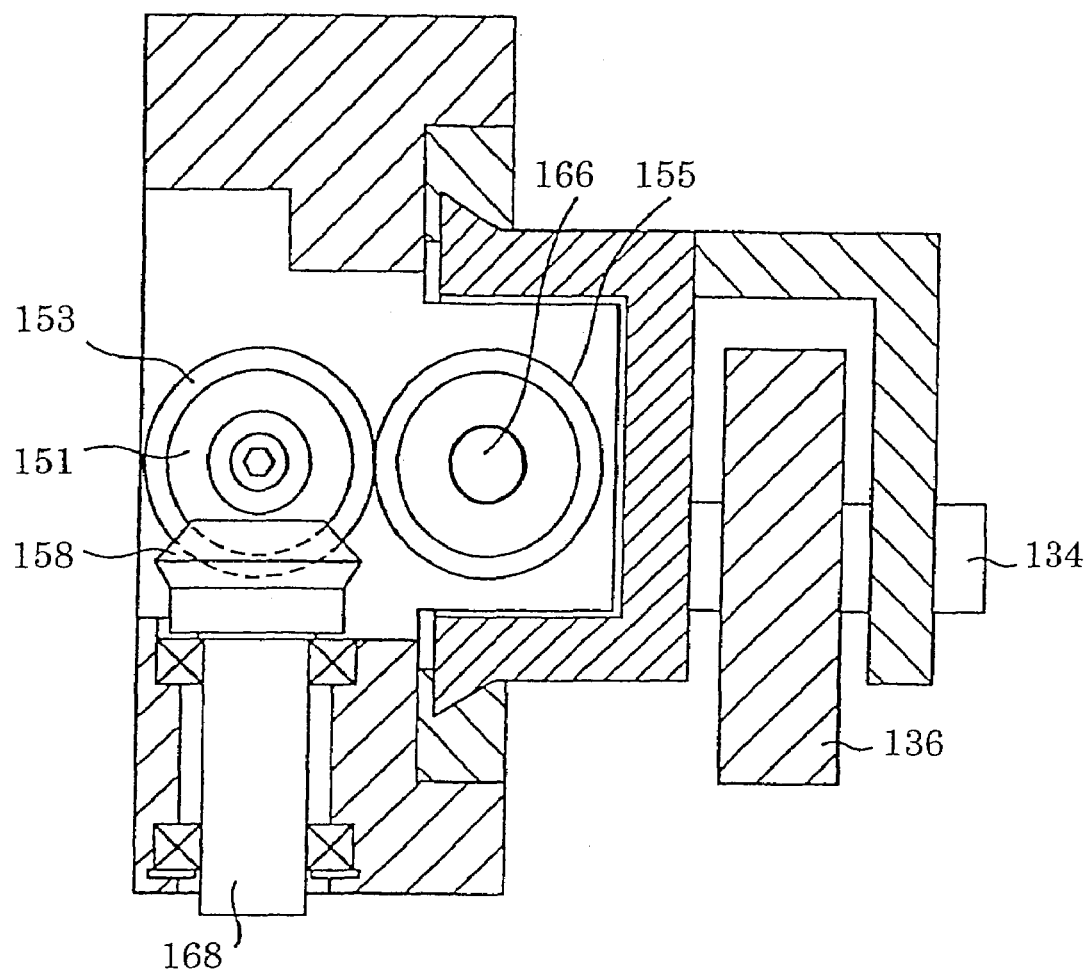
FIG. 15 is a cross-sectional view of a tool holder taken on line 15-15 in FIG. 11.

FIGS. 11-14 illustrate the detail of the tool holder 220 of the profile machining apparatus 110. To this end, FIG. 11 provides a front view, FIG. 12 provides a left side view, FIG. 13 provides a right side view, and FIG. 14 provides a bottom plan view. In addition, FIG. 15 provides a cross-sectional view taken on the line 15-15 of FIG. 11. The same surfaces of the tool holder 220 are respectively shown in FIGS. 9A and 13 and in FIGS. 9B and 11. A tapped hole 164 shown in FIG. 12 is the hole into which the lock screw 162 is installed, and a bevel gear 150 shown in FIG. 12 provides a means for receiving power from the faceplate 140.

As best illustrated in FIG. 11, a nut 167 is threadedly engaged to a feed screw 166 which is connected to the carriage 130. When the feed screw 166 rotates, the carriage 130 advances and retracts along with the nut 167. In addition, as shown in FIGS. 12 and 13, the carriage 130 and the template 240 are mounted on a carriage stand 170. When cutting is conducted a plurality of times, the whole carriage stand 170 may be advanced and retracted in a radial direction of a pipe by rotating the manual handle 160. The template 240 is mounted on the carriage stand 170 with screws 142, and when the screw 142 is loosened, the template 240 may be moved in an axial direction of the pipe.

The power transmission mechanism of the tool holder 220 of apparatus 110 is best illustrated in FIGS. 11, 14 and 15. It is used to transmit the rotation from the faceplate 140 to advance and retract the carriage 130 in an axial direction of the pipe "P". The power transmission mechanism includes gears 150, 151, 152, 153, 154, 155, 156, 158, a feed screw 166, a nut 167, and a shaft 168. The rotation transmitted from the faceplate 140 is transmitted to the bevel gear 150 and then to the gears 152, 154 and 156. The shaft 168 has a keyway and extends through the gear 156. The bevel gear 158 engages the bevel gear 151 and is attached to an end of the shaft 168. Thus, the rotation of the gear 156 is transmitted to the bevel gear 158, then to the bevel gear 151, and then to the feed screw 166 through spur gears 153 and 155. The nut 167 is threadedly engaged with the feed screw 166 and is connected to the carriage 130. Therefore, when the feed screw 166 rotates, the carriage 130 advances and retracts along the feed screw with the nut 167.

While the profile machining apparatus 110 has been explained above with respect to grinding an inner diameter surface of a pipe, the present invention is not limited to this use and can be utilized to grind an outer diameter surface of a pipe. For example, it can grind an outer diameter surface of a pipe when the template 240, the profiling roller 132, and the tool 133 of the tool holder 220 are provided in a position which is symmetrical to the above-explained position relative to the feed screw 166. In this condition, the swinging direction of the carriage 130 is reversed relative to a support shaft 134.

Turning to a third embodiment according to the present invention, a profile machining apparatus 412 is illustrated in FIGS. 16-20. A front view of the profile machining apparatus 412 is illustrated in FIG. 16A and a side view of the apparatus mounted on a pipe is illustrated in FIG. 16B. A manual feed apparatus 200 (discussed below in greater detail) is shown in FIG. 16A, but not in FIG. 16B for illustrative purposes. The profile machining apparatus 412 can be used to form a lip and a groove in an outer surface of the pipe "P". As shown in FIGS. 16A and 16B, the profile machining apparatus 412 includes a housing 420 mounted on a pipe "P", a faceplate 440 rotatably mounted on a front surface of the housing 420, and a tool holder 422 mounted on the faceplate 440 and holding a tool 433. When the tool holder 422 is mounted and rotated on the faceplate 440 and a relative velocity between the faceplate 440 and the ring gear (not shown) therein is generated, an outer surface of the pipe is cut by the tool 433.

The tool holder 422 includes a carriage 430 having the tool 433 mounted thereon, a template 441 having a groove 444, and a power transmission mechanism. A profiling shaft 431 extends from the carriage 430 and is received within and follows the groove 444 of the template 441. The power transmission mechanism (described below in greater detail) receives power from the faceplate 440 and advances and retracts the carriage 430. When the profiling shaft 431 follows the groove 444 of the template 441, a lip having a predetermined shape is formed in an outer surface of the pipe "P".

Figure 17A:
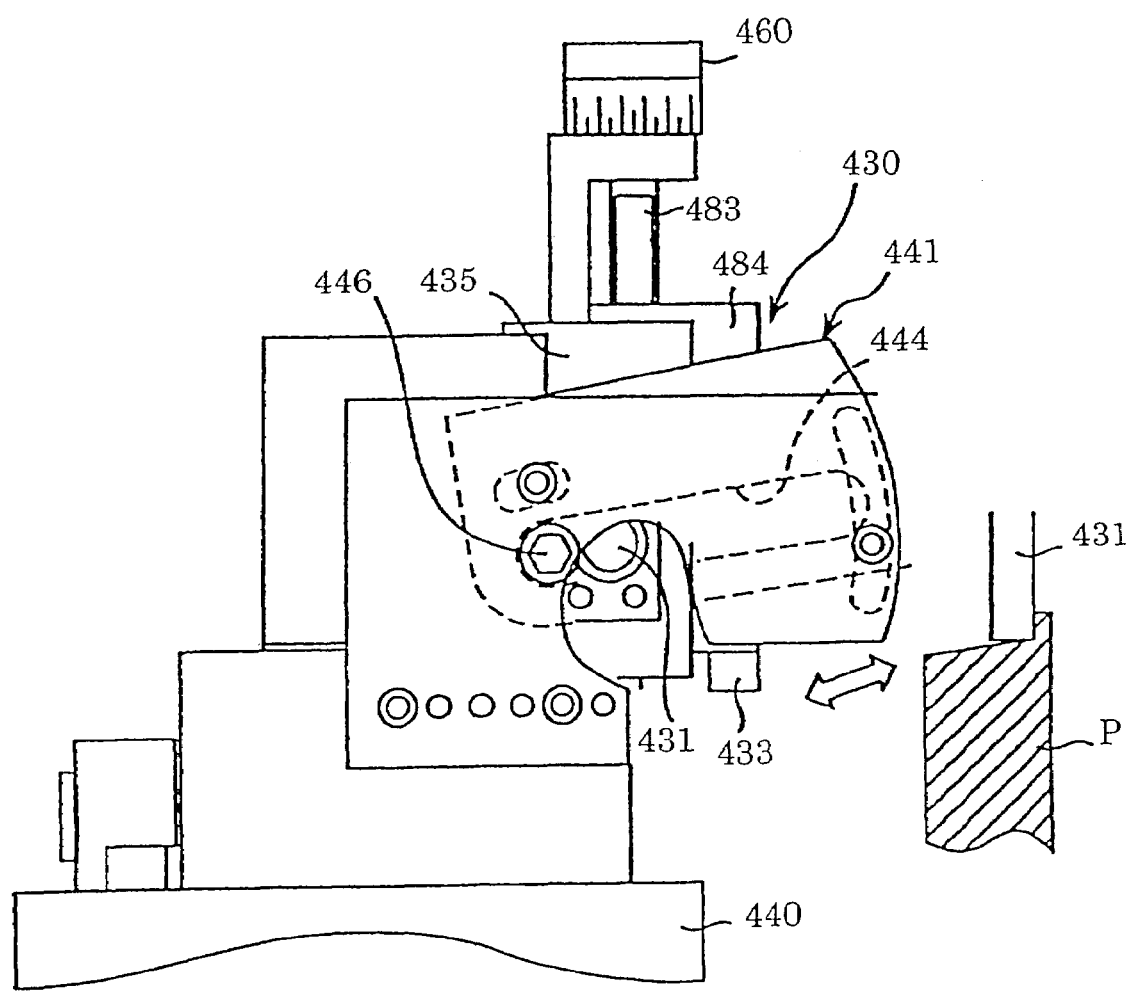
FIGS. 17A and 17B are elevational views of an alternate embodiment of a tool holder of the profiling apparatus illustrated in FIG. 16A adjacent an edge of a pipe.
Figure 17B:
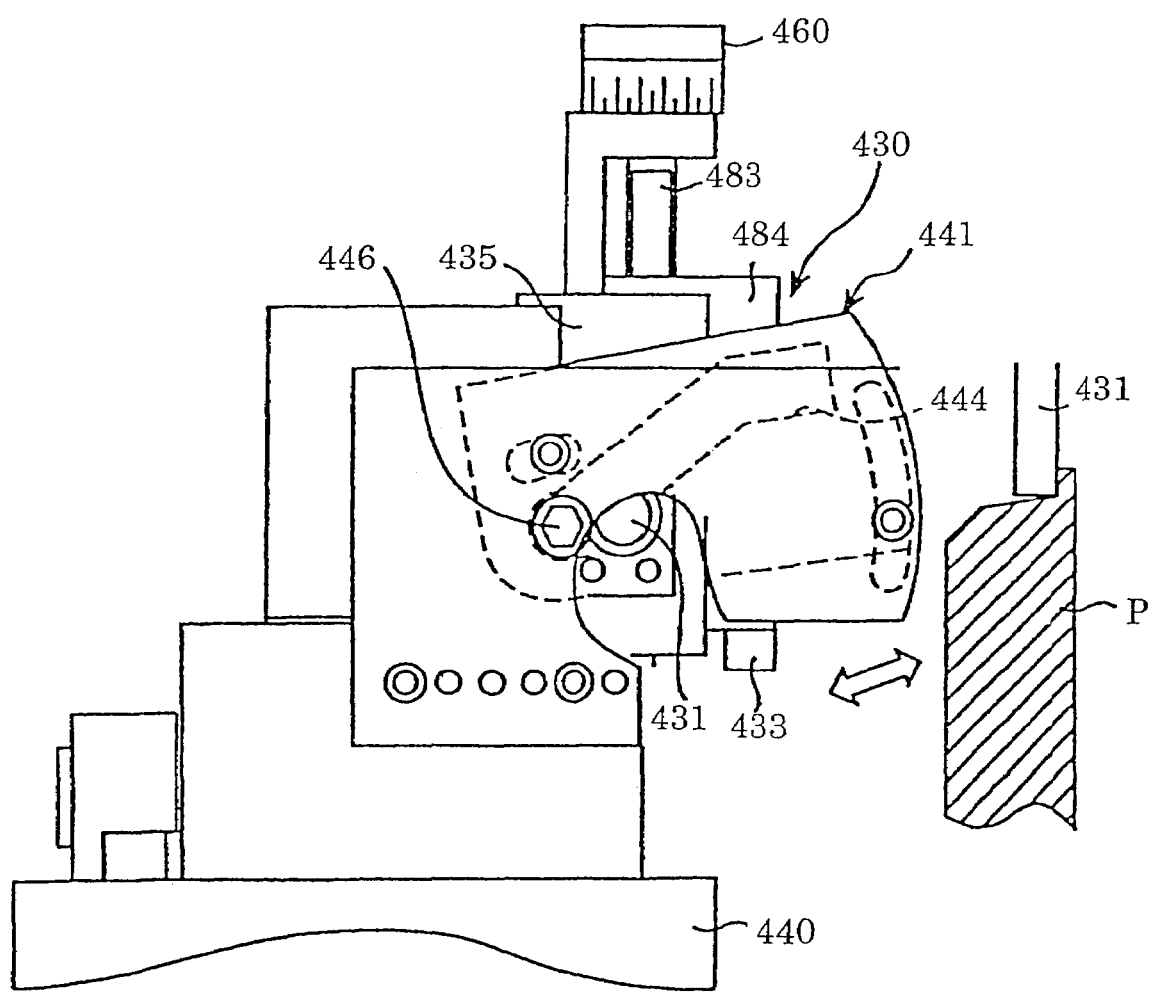

Movement of the tool holder 422 is best illustrated in FIGS. 17A and 17B. The tool 433 is moved to an appropriate position in a rapid-feed mode (as described with respect the first embodiment of the present invention). Next, the position of the tool 433 in an axial direction of the pipe "P" is adjusted with a manual handle 460. The profiling shaft 431 is inserted into the groove 444 of the template 441, and the carriage 430 advances and retracts according to the shape of the groove 444 of the template 441.

The template 441 and groove 444 enables the tool 433 to be moved in any direction. For example, the groove 444 may have the shape of a polygonal line as shown in FIG. 17B to form the outer surface of a pipe with a desired shape. Since the shape of the groove 444 can be readily formed having any desired shape, the outer surface of the pipe can be easily machined to any desired profile.

Conventionally, there has not existed a profile machining apparatus capable of forming a lip of a pipe with a power transmission mechanism that utilizes the difference between the numbers of teeth of gears (as explained with respect to the first embodiment of the present application). Rather, there has only been an edge-preparing apparatus which machines a pipe by pressing the entire surface of a tool on the pipe. A profile machining apparatus 412, which uses profile machining technology according to the present invention, provides the advantages of minimizing contact area of the tool 433 with the pipe and enabling an edge of a pipe to be machined with a desired profile with great accuracy.

Figure 18:
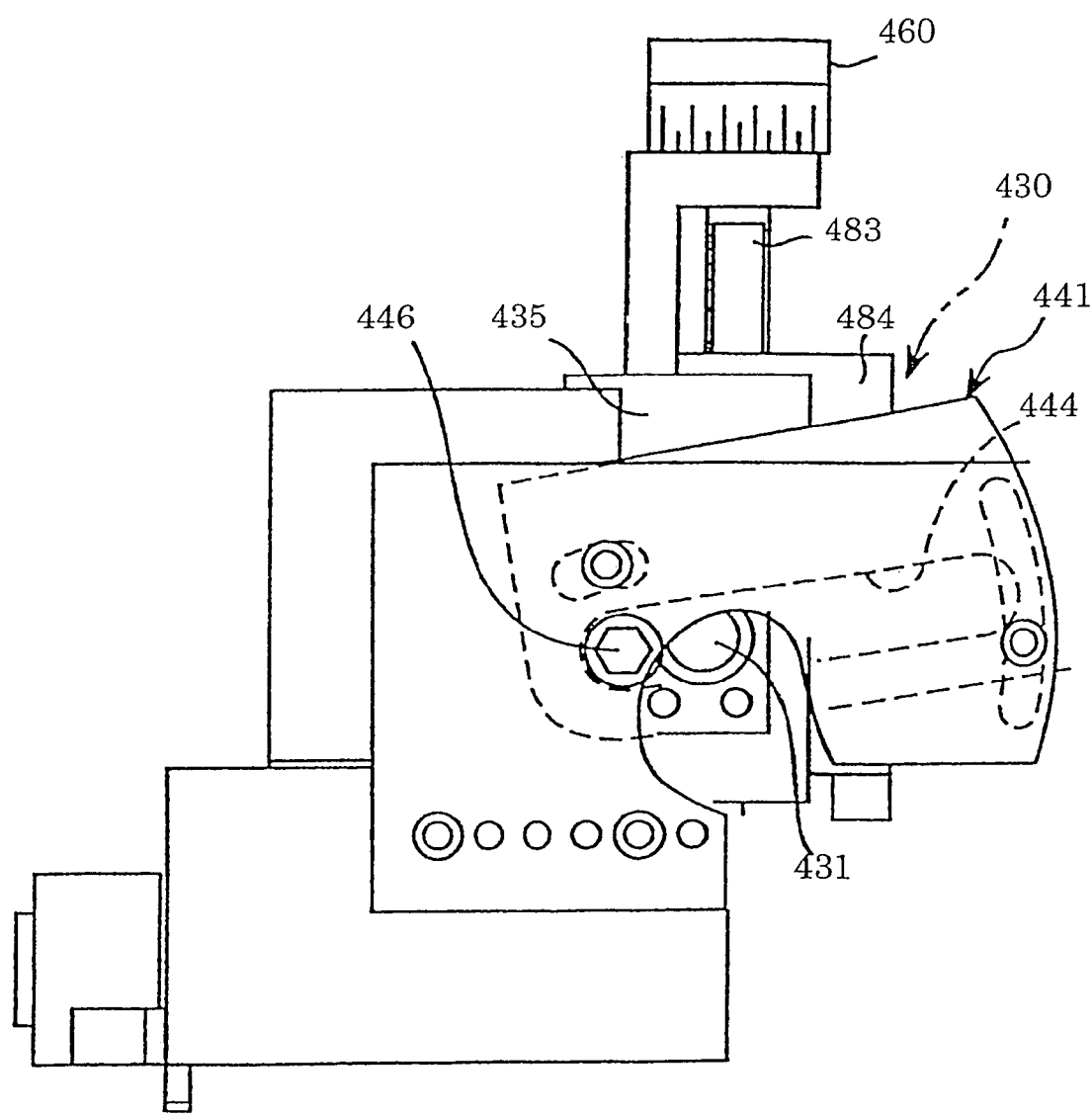
FIG. 18 is a front elevational view of the alternate embodiment of the tool holder of the profiling apparatus illustrated in FIG. 16A.
Figure 19:
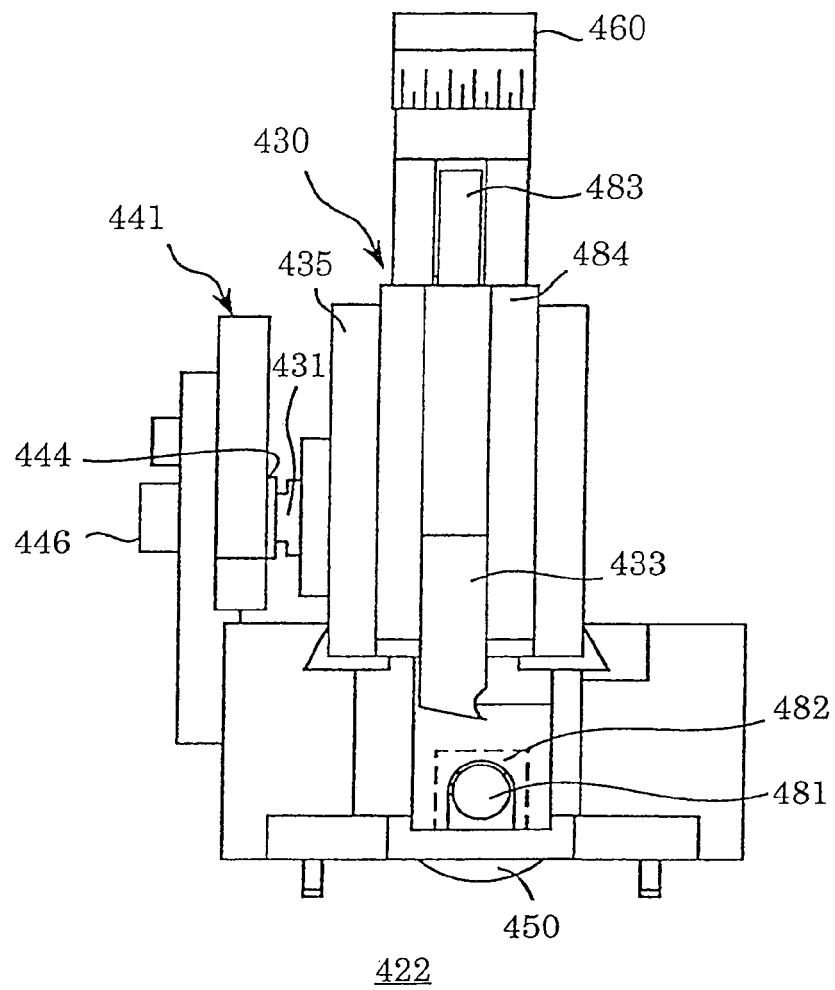
FIG. 19 is a right side elevational view of the alternate embodiment of the tool holder of the profiling apparatus illustrated in FIG. 16A.
Figure 20:
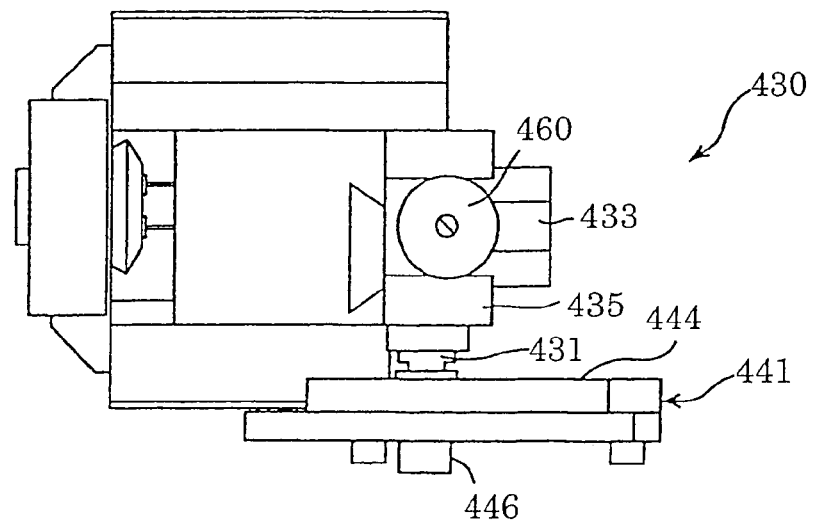
FIG. 20 is a top plan view of the alternate embodiment of the tool holder of the profiling apparatus illustrated in FIG. 16A.

The tool holder 422 of the profile machining apparatus 412 is illustrated in a front view, a right side view, and a top plan view in FIGS. 18-20. The same surfaces of the tool holder 422 are respectively shown in FIGS. 16A and 20, and in FIGS. 16B and 19. A bevel gear 450 shown in FIG. 19 receives power from the faceplate 440.

The profiling shaft 431 is supported by a profiling shaft support 435 of the carriage 430 and is inserted into and movable within the groove 444 of the template 441. The angle of the template 441 relative to the pipe can be continuously changed as the template 441 travels relative to the shaft 446. In addition, when it is necessary to make a fine adjustment to the position of the tool 433 so as to finish a lip, an adjustment of the position of the tool 433 in an axial direction of the pipe can be made by turning the manual handle 460 which transmits rotation to a feed screw 483 and causes section 484 of the carriage 430 to move up (or down).

Figure 16A:
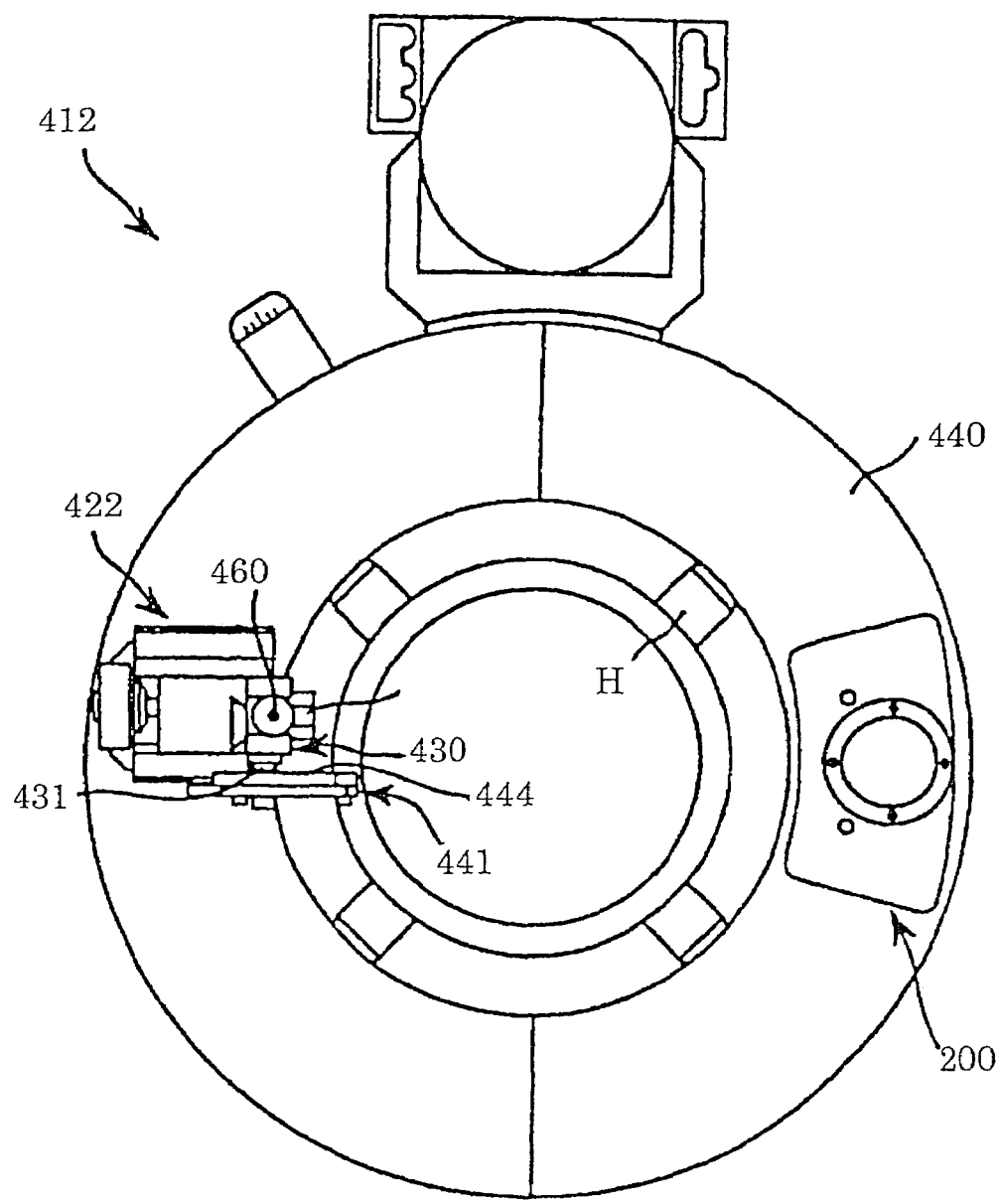
FIGS. 16A and 16B are a front elevational view and a side elevational view, respectively, of a third embodiment of a profiling, machining, and edge-preparing apparatus according to the present invention.
Figure 16B:
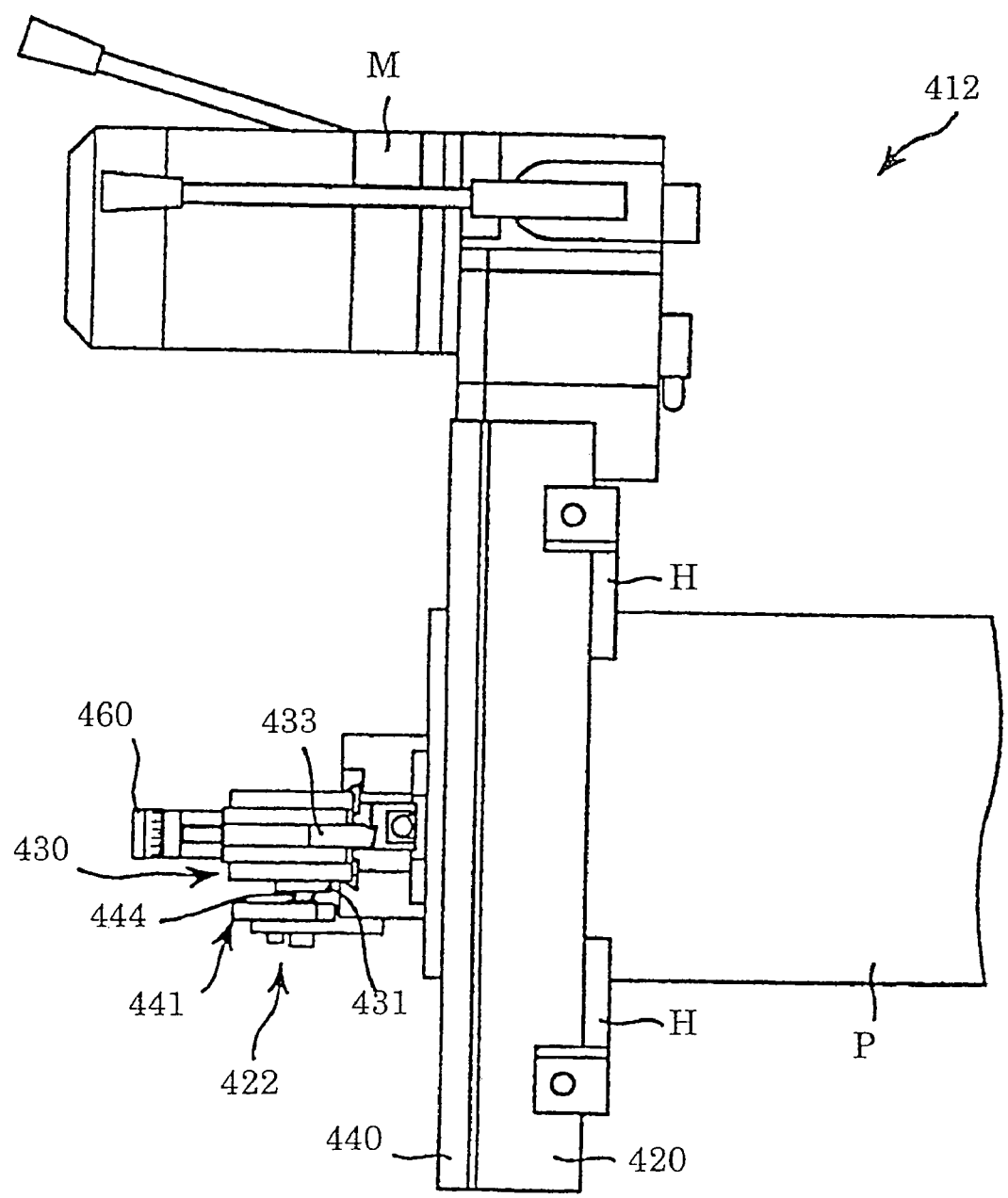
Figure 23A:
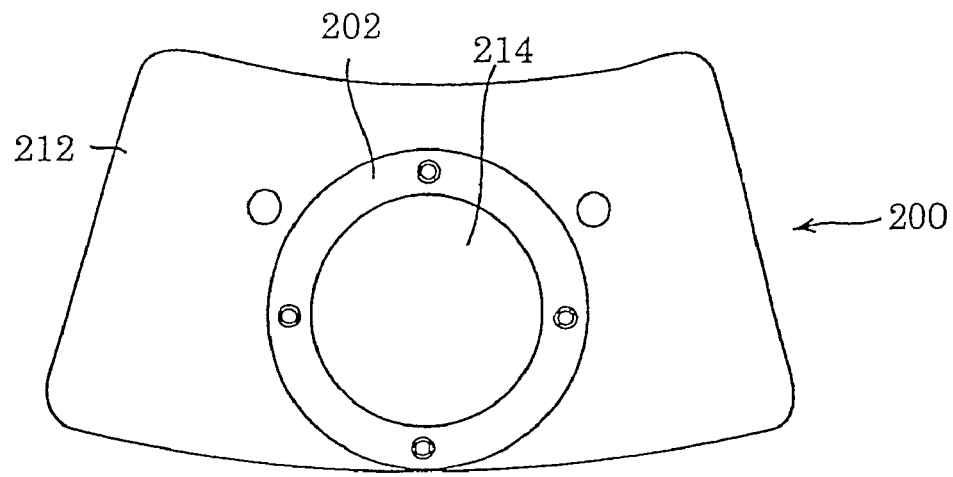
FIGS. 23A and 23B are top plan and side elevational views of a manual feed apparatus for manually feeding a carriage according to the present invention.
Figure 23B:
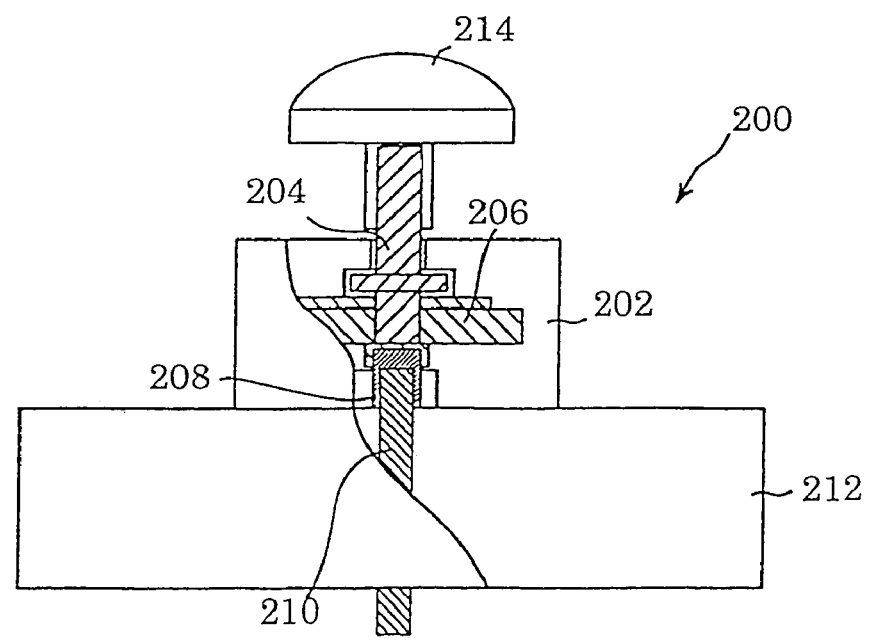

If desired, the position of the carriage 430 relative to the pipe "P" in a feed direction may be manually adjusted by using a manual feed apparatus 200 which is best illustrated in FIGS. 9A, 16A and 23. The manual feed apparatus 200 is mounted opposite to the tool holder, 220, 422, on the faceplate, 140, 440. The rotation of a knob 214 is transmitted to a gear 204 in a case 202 and then to a planetary gear 206. The reduced rotation of the planetary gear 206 is transmitted to a spur gear 208. A hexagon bar 210 in the spur gear 208 is inserted into a hexagon socket in the center of a bevel gear in the faceplate, 140, 440, and thus, a carriage, 130, 430, advances or retracts. A balancer 212 is mounted opposite to the tool holder, 220, 422, so as to prevent unstable rotation.

The power transmission mechanism of the tool holder 422 of the profile machining apparatus 412 is best shown in FIG. 19. The power transmission mechanism transmits rotation from the faceplate 440 to advance and retract the carriage 430 and includes a gear 450, a nut 482, and a feed screw 481.

The rotation transmitted from the faceplate 440 is transmitted to the bevel gear 450 which is connected to the feed screw 481. The feed screw 481 has a keyway, and the feed nut 482 is mounted on the feed screw 481. The feed nut 482 is sandwiched in the carriage 430. Therefore, when the bevel gear 450 rotates, the carriage 430 advances and retracts.

The cutting direction of the profile machining apparatus 412 can be changed instantly from a direction to the outside of the pipe to a direction to the inside of the pipe, or from a direction to the inside of the pipe to a direction to the outside of the pipe, by operating a feed lever and by reversing the direction of rotation of the faceplate 440. The groove of the template may be formed in a shape which enables an end face of a pipe to be machined to a desired profile.

As explained above, the second and third embodiments of the present invention minimize the contact area of a tool with a pipe and form an edge of a pipe in any desired shape easily with great accuracy since the movement of the tool is controlled by a template and since the tool can automatically change its position and direction while it is advanced and retracted. In addition, in the case of a conventional edge-preparing apparatus, a tool needs to be produced according to the respective desired shape of a machined pipe since the shape of the machined pipe is determined by the shape of the tool. In contrast, the present invention can be used to form an edge profile of any shape with an ordinary cutting tool.

While preferred embodiments of a cutting and/or profiling apparatus have been described, various modifications, alterations, and changes may be made without departing from the spirit and scope of the invention as defined in the appended claims.

The invention claimed is:

1. A cutting and edge-preparing apparatus, comprising:
   a housing adapted to be mounted on a workpiece;
   a faceplate mounted on a front surface of said housing and being rotatable relative to said housing;
   at least one tool holder mounted on said faceplate for holding a tool;
   a gearbox having first gearing for turning said faceplate and second gearing connected to a power transmission shaft for advancing and retracting said tool holder relative to the workpiece; and
   a motor;
   said first and second gearing each having a predetermined number of teeth, and said number of teeth of said first gearing being different from said number of teeth of said second gearing; and
   said second gearing having a changeable combination of gears for changing the difference between said number of teeth of said first gearing for turning the faceplate and said number of teeth of said second gearing for turning said power transmission shaft;
   whereby, turning direction and turning speed of said power transmission shaft relative to turning speed of said faceplate can be changed to permit said tool holder to be moved relative to the workpiece in rapid-feed, slow-feed, and rapid-return modes.

2. A cutting and edge-preparing apparatus according to claim 1, wherein an annular faceplate gear is attached to a rear surface of said faceplate and is engaged with said first gearing of said gearbox to rotate said faceplate relative to said housing; wherein said housing contains a speed-changing compound ring gear having two external gears with different diameters and a single internal gear; wherein said second gearing includes a feed gearing and a rapid-feed-and-return gearing, and said power transmission shaft is rotated by one of said feed gearing and said rapid-feed-and-return gearing; wherein each of said feed gearing and said rapid-feed-and-return gearing includes a compound gear that has a plurality of gears and two transmission gears that have different diameters and that are capable of being engaged with said compound gear; and wherein said number of teeth of said first gearing for rotating the faceplate and that of said second gearing for rotating the power transmission shaft are made to differ from each other by a combination of said plurality of gears of said compound gear and said transmission gears.

3. A cutting and edge-preparing apparatus according to claim 2, wherein said compound gears of said feed gearing and said rapid-feed-and-return gearing are shifted in axial directions by shift arms; wherein said shift arms are connected to levers by rods; wherein said levers extend externally of said gearbox; and wherein said combination of said plurality of gears of said compound gear and said transmission gears of said feed gearing and said combination of said plurality of gears of said compound gear and said transmission gears of said rapid-feed-and-return gearing are changed by operating said levers.

4. A cutting and edge-preparing apparatus according to claim 3, wherein a clutch is installed between said motor and said faceplate.

5. A cutting and edge-preparing apparatus according to claim 4, wherein said rods control lever movement such that said compound gear and said transmission gears of said feed gearing, and said compound gear and said transmission gears of said rapid-feed-and-return gearing are not simultaneously engaged.

6. A cutting and edge-preparing apparatus according to claim 1, wherein said second gearing includes a feed gearing and a rapid-feed-and-return gearing; wherein said power transmission shaft is rotated by one of said feed gearing and said rapid-feed-and-return gearing; wherein each of said feed gearing and said rapid-feed-and-return gearing includes a compound gear that has a plurality of gears and two transmission gears that have different diameters and that are capable of being engaged with said compound gear; wherein said compound gears of said feed gearing and said rapid-feed-and-return gearing are shiftable in axial directions by shift arms; wherein said shift arms are connected to levers by rods; wherein said levers extend externally of said gearbox; and wherein said combination of said plurality of gears of said compound gear and said transmission gears of said feed gearing and said combination of said plurality of gears of said compound gear and said transmission gears of said rapid-feed-and-return gearing are changed by operating said levers.

7. A cutting and edge-preparing apparatus according to claim 6, wherein said rods control lever movement such that said compound gear and said transmission gears of said feed gearing, and said compound gear and said transmission gears of said rapidfeed-and-return gearing are not simultaneously engaged.

8. A cutting and edge-preparing apparatus according to claim 1, wherein a clutch is installed between said motor and said faceplate.

* * * * *